US012601472B2

(12) United States Patent
Henrici et al.

(10) Patent No.: US 12,601,472 B2
(45) Date of Patent: Apr. 14, 2026

(54) CONNECTION ELEMENT FOR AN LED LIGHT MODULE

(71) Applicant: BJB GmbH & Co. KG, Arnsberg (DE)

(72) Inventors: Philipp Henrici, Arnsberg (DE); Olaf Baumeister, Sundern (DE); Markus Pieper, Arnsberg (DE)

(73) Assignee: BJB GmbH & Co. KG, Arnsberg (DE)

( * ) Notice: Subject to any disclaimer, the term of this patent is extended or adjusted under 35 U.S.C. 154(b) by 0 days.

(21) Appl. No.: 18/903,249

(22) Filed: Oct. 1, 2024

(65) Prior Publication Data

US 2025/0109849 A1 Apr. 3, 2025

(30) Foreign Application Priority Data

Oct. 2, 2023 (DE) ..................... 10 2023 126 814.7

(51) Int. Cl.
*F21V 23/06* (2006.01)
*F21V 19/00* (2006.01)
*F21Y 115/10* (2016.01)

(52) U.S. Cl.
CPC ............ *F21V 23/06* (2013.01); *F21V 19/003* (2013.01); *F21Y 2115/10* (2016.08)

(58) Field of Classification Search
CPC ............................... F21V 23/06; F21V 19/003
See application file for complete search history.

(56) References Cited

U.S. PATENT DOCUMENTS

2009/0191725 A1* 7/2009 Vogt ..................... H01R 12/714 439/56
2012/0051065 A1* 3/2012 Daily .................... F21V 17/005 362/311.02
2012/0051068 A1 3/2012 Pelton et al.
2012/0287644 A1* 11/2012 Wronski ................. F21V 13/00 362/296.01
2014/0179139 A1 6/2014 Tanaka et al.
2014/0286022 A1 9/2014 Kimiya et al.
(Continued)

FOREIGN PATENT DOCUMENTS

CN 106704904 A 5/2017
DE 102008005823 A1 8/2009
(Continued)

OTHER PUBLICATIONS

DE-102017101809-B4 Machine Translation (Year: 2018).*

*Primary Examiner* — Christopher E Dunay
(74) *Attorney, Agent, or Firm* — Smartpat PLC

(57) ABSTRACT

A connection element for the electrical connection of an LED light module is described. The LED light module has a circuit board with contact pads for supplying electricity to the LED. A substantially ring-shaped frame is provided to overlap the circuit board and to hold it mechanically on a mounting surface of a counter bearing. A contact arrangement is mounted in the frame and serves to supply electricity to the LED. The frame is divided into a first ring and a second ring. The first ring is provided to surround the circuit board and to hold it in the parallel direction with respect to the mounting surface of the counter bearing, and the second ring at least partially overlaps the circuit board and is provided to hold the circuit board in the vertical direction with respect to the surface of the counter bearing.

20 Claims, 40 Drawing Sheets

(56) References Cited

U.S. PATENT DOCUMENTS

| | | | | |
|---|---|---|---|---|
| 2015/0055356 | A1* | 2/2015 | Derks | H01R 13/24<br>362/418 |
| 2015/0276173 | A1* | 10/2015 | Vasta | F21V 31/005<br>362/296.05 |
| 2016/0312984 | A1 | 10/2016 | Poorter et al. | |
| 2017/0102115 | A1 | 4/2017 | Takeda et al. | |
| 2018/0003365 | A1* | 1/2018 | Nanni | F21V 17/14 |

FOREIGN PATENT DOCUMENTS

| | | | | |
|---|---|---|---|---|
| DE | 102017101809 | B4 * | 12/2019 | F21V 19/0055 |
| DE | 102018118119 | A1 | 1/2020 | |
| WO | 2016020446 | A2 | 2/2016 | |

* cited by examiner

CONNECTION ELEMENT FOR AN LED LIGHT MODULE

CROSS-REFERENCE TO RELATED APPLICATION

This application claims the benefit of German Patent Application DE 10 2023 126 814.7, filed on Oct. 2, 2023, the content of which is incorporated in its entirety.

TECHNICAL FIELD

The disclosure relates to a connection element for the electrical connection of an LED light module. The LED light module has a circuit board which is provided with contact pads for supplying electricity to the LED, and having a substantially ring-shaped frame which is provided to overlap the circuit board and to hold it mechanically on a mounting surface of a counter bearing, and having a contact arrangement which is mounted in the frame and serves to supply electricity to the LED.

BACKGROUND

A generic connection element is disclosed in the applicant's German patent DE 10 2008 005 823 B4. It is a ring element which overlaps a circuit board and is able to hold the circuit board between itself and a counter bearing, in particular a heat sink. For this purpose, the ring element is fixed by screw bolts, for example, on the counter bearing. It sits on the circuit board with a part of its surface facing towards the circuit board. The ring element supports contacts in contact chambers. These contacts have a clamping section into which the stripped end of a connection lead is to be inserted. The connection lead is held in the clamping section and is electrically contacted. Each contact then has spring legs that serve as pressure contacts and rest on contact pads on the circuit board. The connection element from the aforementioned patent specification thus serves both for electrically contacting and for mechanically holding the circuit board on a counter bearing. The circuit board itself supports an LED. It is therefore a light module that is used in luminaires instead of more familiar filament lamps or similar conventional light modules.

Generic connection elements have proved extremely successful in practice and are used in particular for spot lighting, provided this uses LED light modules.

LED technology has developed considerably in the meantime. Circuit boards with attached LEDs are now available in a large number of luminous intensities and outputs, which is why the shape and, above all, the size of the circuit boards and the LEDs arranged on them vary greatly from manufacturer to manufacturer and in different output classes.

Therefore, there are many generic connection elements on the market, which each make many specific LED circuit boards of a particular producer and of a particular performance class usable. This is fundamentally advantageous since there are suitable connection elements available for each intended use. However, this product supply is not sufficient for the requirements of the luminaire industry. In that industry, sub-components of luminaires are stored pre-assembled and then finally assembled when a particular type of luminaire is purchased.

For example, a particular luminaire type is provided in different intensities, i.e. with different luminosity or colour temperature of the light module. On the one hand, the standardised housing components are provided for this type of luminaire. On the other hand, the actual luminaire fixture-usually consisting of an LED light module mounted on a suitably dimensioned heat sink—is kept in stock in different variants. In this manner, a modular system can be used when luminaires are ordered, which enables simple final assembly of the required luminaire.

The disadvantage here, however, is that a large number of luminaire fixtures have to be kept in stock. The completely pre-assembled unit consisting of an LED light module, connection element and suitable heat sink represents a significant value of the actual luminaire. Depending on the number of variants of a type of luminaire, a large amount of inventory must be stored.

SUMMARY

The present application presents a connection element which can be used flexibly with regard to the different circuit board variations of LED light modules.

This is achieved by a connection element as claimed. The connection element includes a frame that is divided into a first ring and a second ring. The first ring is provided to surround the circuit board and to hold it in the parallel direction with respect to the mounting surface of the counter bearing. The second ring at least partially overlaps the circuit board and is provided to hold the circuit board in the vertical direction with respect to the surface of the counter bearing.

The division of the connection element into two pieces, namely into a first ring, which laterally holds the circuit board on a counter bearing, and a second ring, which overlaps the circuit board, i.e. rests on the circuit board in order to hold it in a vertical direction with respect to the surface of the counter bearing, initially allows the degree of pre-assembly of the luminaire fixture to be reduced. The final assembly, i.e. insertion of the circuit board with LED into the first ring and then the fixing of the circuit board in the vertical direction, can take place at a later time. In this manner, a partially assembled unit consisting of first ring and counter bearing can be completed at a later stage with an LED circuit board to be selected with regard to its output and light colour or similar properties. Assuming a standardised circuit board size, the respectively required LED circuit boards can be added shortly before the final assembly of the actual luminaire.

Preferably the first ring has at least one retaining part, the second ring has at least one coupling part, and the retaining part and the coupling part interact with each other in order to fix the second ring to the first ring.

In this manner, the two rings can be arranged fixed to each other and joined together to form an assembly.

This is particularly advantageous when one of the rings is provided to be attached with fasteners to the counter bearing in order to mechanically anchor the circuit board.

In this case, only one of the rings needs to be attached to the counter bearing in order to fix the entire assembly, i.e. the complete connection element, on the counter bearing.

Specifically, it is provided that only one of the rings, preferably the first ring, is provided to be attached with fasteners to the counter bearing in order to mechanically anchor the circuit board, whereas the other ring, preferably the second ring, is only fixed to the first ring in order to mechanically anchor the circuit board.

The contact arrangement is formed from at least one supply contact, which is provided to be arranged on a contact pad of the circuit board in order to supply electricity, and for this purpose forms in particular a pressure contact, preferably a spring leg.

However, it is also conceivable that the contact arrangement comprises at least one connection contact, which serves for the solderless connection of a connection lead in order to supply electricity to the LED and in particular serves as a clamping contact for connecting a stripped connection lead.

With the two-piece connection element, it is possible that the connection contact and the supply contact are formed from one and the same component and only one of the two rings, i.e. either the first ring or the second ring, supports the contact arrangement.

It is also conceivable that the contact arrangement consists of the connection contact and the supply contact and is formed from two independent contact components. One of the rings, in particular the first ring, may support the connection contact. The other ring, in particular the second ring, may support the supply contact. The connection contact and the supply contact may enter into an electrical connection with each other when the rings are combined in an assembled state forming the frame.

In this embodiment, the wiring, which often has to be done manually and is therefore costly, can be carried out before the final assembly of the luminaire. The luminaire fixture could thus consist of the heat sink, the first ring and the connection wiring fitted to the first ring, whereas the LED circuit board and the second ring are only inserted before the final assembly of the luminaire. In this case, it is then provided that placing the first ring on the second ring also electrically connects the connection contact and the supply contact to each other, wherein the supply contact simultaneously enters into an electric connection with the contact pads of the LED circuit board.

An inner contour of the first ring has abutment surfaces which are provided to cooperate with marginal edges of the circuit board in order to hold the circuit board in the parallel direction with respect to the mounting surface of the counter bearing, wherein the first ring in particular at least partially receives the outer contour of the circuit board for this purpose.

A first ring designed in such a way is suitable for holding at least circuit boards of a particular type or with a defined outer contour in a horizontal direction substantially without play, i.e. parallel to the mounting surface of the counter bearing, and therefore guaranteeing a defined orientation of the circuit board or the LED arranged on the circuit board. It is conceivable that the inner contour of the first ring only partially receives the outer contour of the circuit board to be inserted. It is conceivable that other parts of the inner contour of the first ring are adapted to the outer contour of a differently built circuit board. In this manner, multiple variations of circuit boards with an LED arranged thereon can be held by the first ring.

A specific development of the connection element according to the invention provides that the first ring and the second ring are mounted one inside the other, in particular are mounted coaxially one inside the other, wherein the first ring is an outer ring and surrounds the second ring formed as an inner ring.

Even though rings mounted one inside the other, in particular rings mounted coaxially one inside the other, are only a preferred embodiment, this design has a number of advantages. When the rings are mounted one inside the other, certain requirements, such as the centring of the LED circuit board and the centring of the second ring with regard to the light emission direction of the LED, can initially be met particularly easily.

Furthermore, there are two components that provide options for receiving certain technical devices such as contacts or other elements that are essential for the function of the connection element.

Firstly, it is provided that the inner ring supports at least one locking element with which the inner ring is fixed inside the outer ring.

By means of the locking element, the inner ring can be anchored particularly easily in the outer ring.

Then it is provided that the outer ring has at least one tension element, in particular a tension spring, which is provided to tension the inner ring in the direction of an LED circuit board inserted in the connection element or in the direction of the counter bearing.

A contact pressure can be applied to the LED circuit board, inserted in the connection element, on the counter bearing, in particular the heat sink, by means of the tension element via the inner ring. This is a significant advantage for optimising the heat transfer from the circuit board to the heat sink.

In this context, it is envisaged that the inner ring has at least one tension receiving element which cooperates with the tension element of the outer ring and transmits the tension forces onto the inner ring.

In a specific embodiment it is provided that the inner ring can be inserted in the insertion direction into the outer ring and can be fixed in the outer ring by rotating it like a bayonet lock.

With the aid of the bayonet connection, a particularly secure positive locking connection between the first and the second ring is possible, which securely arranges the inner ring in the outer ring even under heavy mechanical loads, in particular vibrations.

In this solution, it is also provided that the tension receiving element engages with the tension element as a result of the rotation.

In this case, it is possible that the tension receiving element also simultaneously serves as a locking element on the part of the inner ring. However, it is easily conceivable that the tension element and the tension receiving element already interact with each other before the rotation that causes the bayonet-like attachment. In this case, it is preferable that the tension receiving element on the part of the inner ring and the locking element on the part of the inner ring represent two independent components.

In one embodiment it is provided that the outer ring forms a retaining element, in particular a latching projection, which interacts with the locking element of the inner ring in order to hold the inner ring in the outer ring.

In particular in this embodiment, it is provided that the retaining element and the tension element are formed by the same component.

This embodiment in which the retaining element and the tension element are formed by one and the same component makes it possible to form simple connection elements that have a reduced number of components.

An alternative attachment of the inner ring in the outer ring can be achieved by inserting the inner ring in the insertion direction into the outer ring and holding it in the outer ring by a latching connection.

In this embodiment, the anchoring of the inner ring in the outer ring is only accomplished by inserting the inner ring into the outer ring, in which the locking element of the inner ring engages behind at least one latching projection.

The invention provides in particular that the first ring is formed as a universal component which is able to receive a plurality of different circuit boards, whereas the second ring is formed as an individual component for a specific circuit board or a group of specific circuit boards with common circuit board geometry or a common LED size.

In this manner, a substantial disadvantage of the prior art can be overcome, specifically the requirement to keep a plurality of different connection elements in stock, which are each adjusted to one or only few different LED circuit boards.

This idea of the invention can be implemented by the fact that an adapter frame is provided which adapts the inner contour of the first ring to the outer contour of the circuit board, in order to ensure a substantially play-free mounting of the circuit board in the first ring.

With such a connection element, the first ring or the outer ring is formed as a universal component. The inner contour of the outer ring is best suited to LED circuit boards of large dimensions, whereas a suitable adapter frame is inserted into the outer ring when using smaller LED circuit boards.

It is also conceivable that the first ring or the outer ring has an inner contour exclusively for receiving the adapter frame and, depending on the LED circuit board used, the appropriate adapter frame is to be inserted into the first ring.

Furthermore, it is conceivable that the adapter frame is a part of the second ring, so that this second ring receives the circuit board.

In this case, the initial advantage is that there is no need for an adapter frame and, in case of doubt, no need to adapt the first ring, which serves as a universal component. Only the second ring or inner ring is designed specifically for the circuit board. Ideally, the circuit board is supplied together with the specific inner ring. The LED circuit board may already be pre-assembled on the specific inner ring. In this case, only one more assembly step is required to finalise the connection element and insert it into the luminaire.

Further advantages of the invention and a better understanding thereof can be found in the following description of two exemplary embodiments.

DETAILED DESCRIPTION

Figure 1:
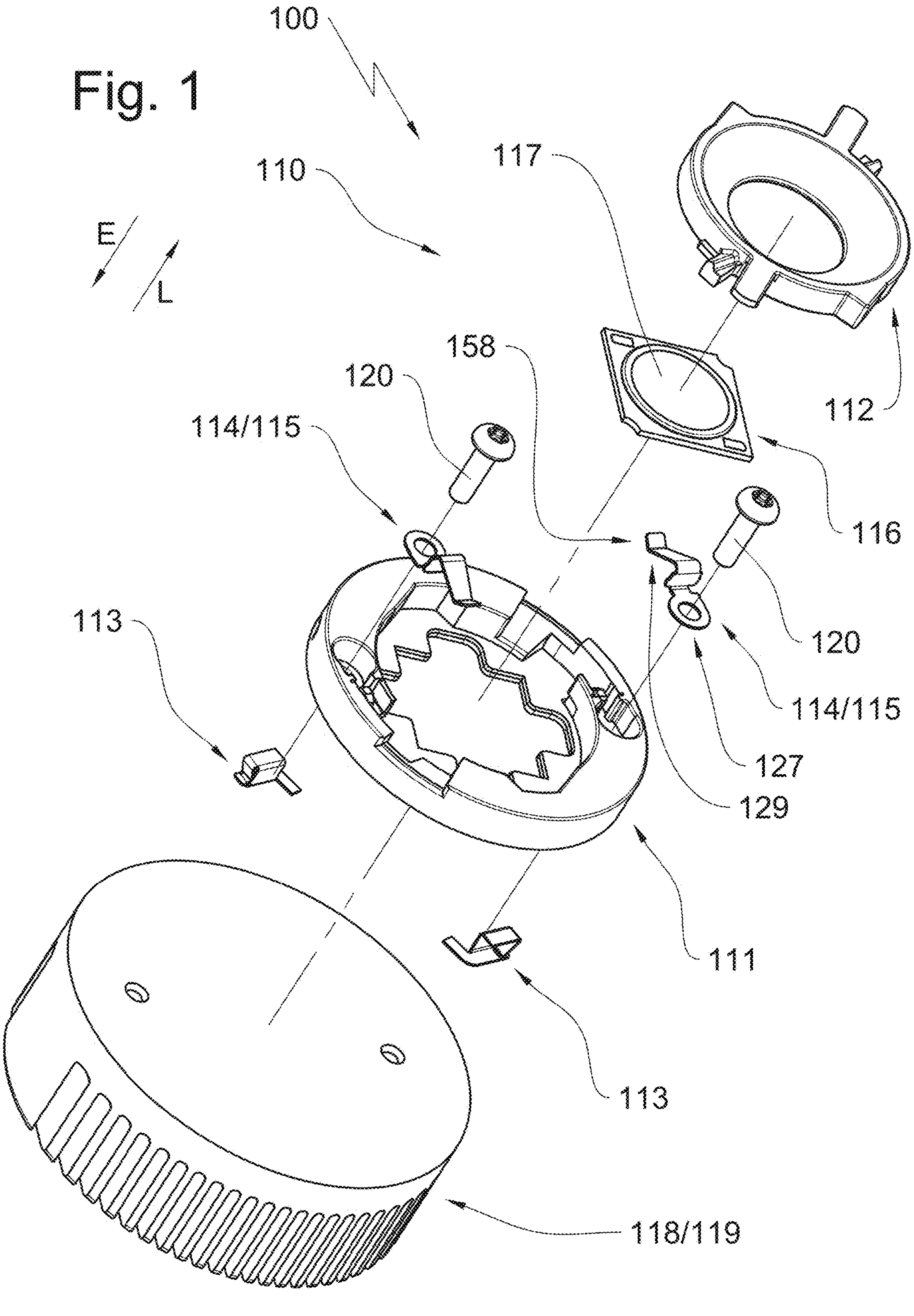
FIG. 1: a first embodiment of a connection element, shown in an exploded view.

In FIGS. 1 to 8, a first embodiment of the connection element is labelled in its entirety with reference numeral 100. A second embodiment of the connection element is shown in FIGS. 9 to 15 and is labelled in its entirety with reference numeral 200. The embodiments 100/200 of the connection element have a number of identical components. Insofar as identical or identically acting components are used, these are named identically and differ only in that they are assigned either to the number range 100 or to the number range 200. Thus, what has been said about the first embodiment always applies to the second embodiment 200, insofar as identical or identically acting components are involved.

According to FIG. 1, the first embodiment comprises a connection element provided in its entirety with the reference numeral 110. The connection element 110 substantially comprises a first ring 111 and a second ring 112. The first ring 111 is also referred to as the outer ring. The second ring 112 is referred to as the inner ring. However, this is primarily due to the fact that in the exemplary embodiment, the rings are arranged one inside the other, resulting in an outer position for the first ring 111 and an inner position for the second ring 112. However, the connection element 110/210 of the first embodiment 100 as well as of the second embodiment 200 is not limited to this specific—albeit advantageous—design with an outer ring 111 and an inner ring 112.

The connection element 110 also has connection contacts 113 and tension elements 114, which are designed as tension springs 115.

On the one hand, the connection element 110 interacts with a circuit board 116, which carries an LED 117 as a light source. On the other hand, the connection element 110 interacts with a counter bearing 118, which is designed as a heat sink 119. Instead of the heat sink 119, however, the counter bearing 118 can also be a luminaire component of any type.

The connection element 110 is fixed to the heat sink 119 by means of screw bolts 120. In the process, the connection element 110 holds the LED circuit board 116 between itself and the heat sink 119.

Figure 2A:
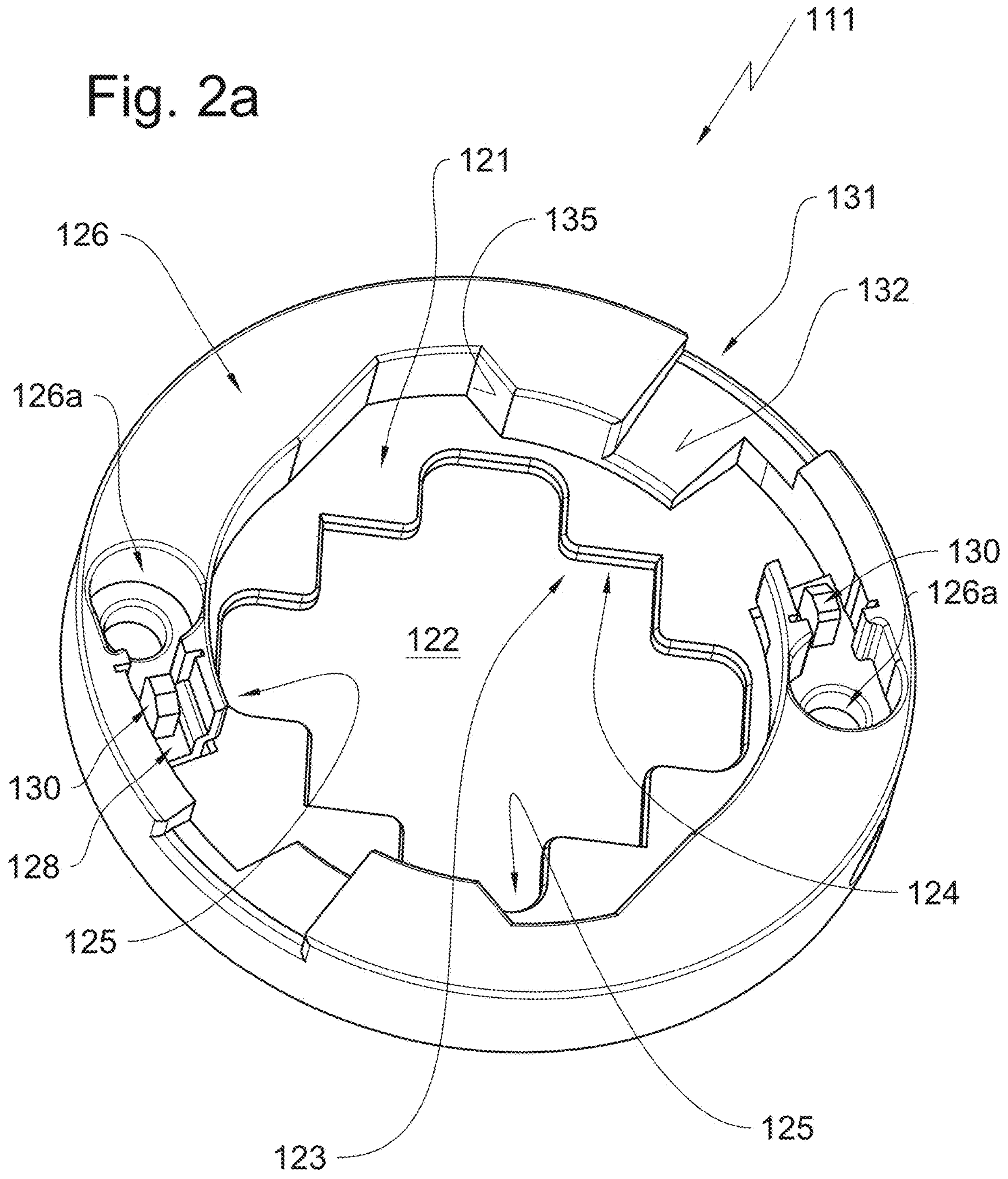
FIG. 2*a*: a perspective representation of the upper side of the first ring/outer ring according to FIG. 1.

FIG. 2*a* shows a perspective view of the upper side of the outer ring 111. The outer ring 111 has a bottom plate 121. The bottom plate 121 has an aperture 122. This aperture 122 defines an inner contour 123 of the outer ring 111, which is subdivided into a rectangular, in particular square, insert contour 124 and engagement contours 125. The engagement contours 125 merge into the insert contour 124.

In the present example, the insert contour 124 is rectangular, in particular square, since the exemplary embodiment uses a correspondingly rectangular, in particular substantially square LED circuit board 116. Different circuit board shapes would lead to a different insert contour 124.

A ring collar 126 sits on the bottom plate 121. This ring collar 126 surrounds the aperture 122 and has receiving holes 126*a* for the screw bolts 120. As can be seen in combination with FIG. 1, the receiving holes 126*a* also serve to receive the retaining section 127 of the tension springs 115, wherein the retaining section 127 is engaged through by the screw bolts 120 in order to secure the tension springs 115 in the outer ring 111.

Starting from the receiving hole 126*a*, a passage channel 128 for a tension spring arm 129 extends in the circumferential direction. A support pin 130 is arranged in the passage channel 128, which serves as a positioning aid for correct positioning of the tension springs 115 during assembly.

The ring collar 126 is countersunk at two opposite circumferential sections and thus forms a wall hook receptacle 131. Each wall hook receptacle 131 has a centring surface 132, which slopes downwards towards the centre of the outer ring 111.

Figure 2B:
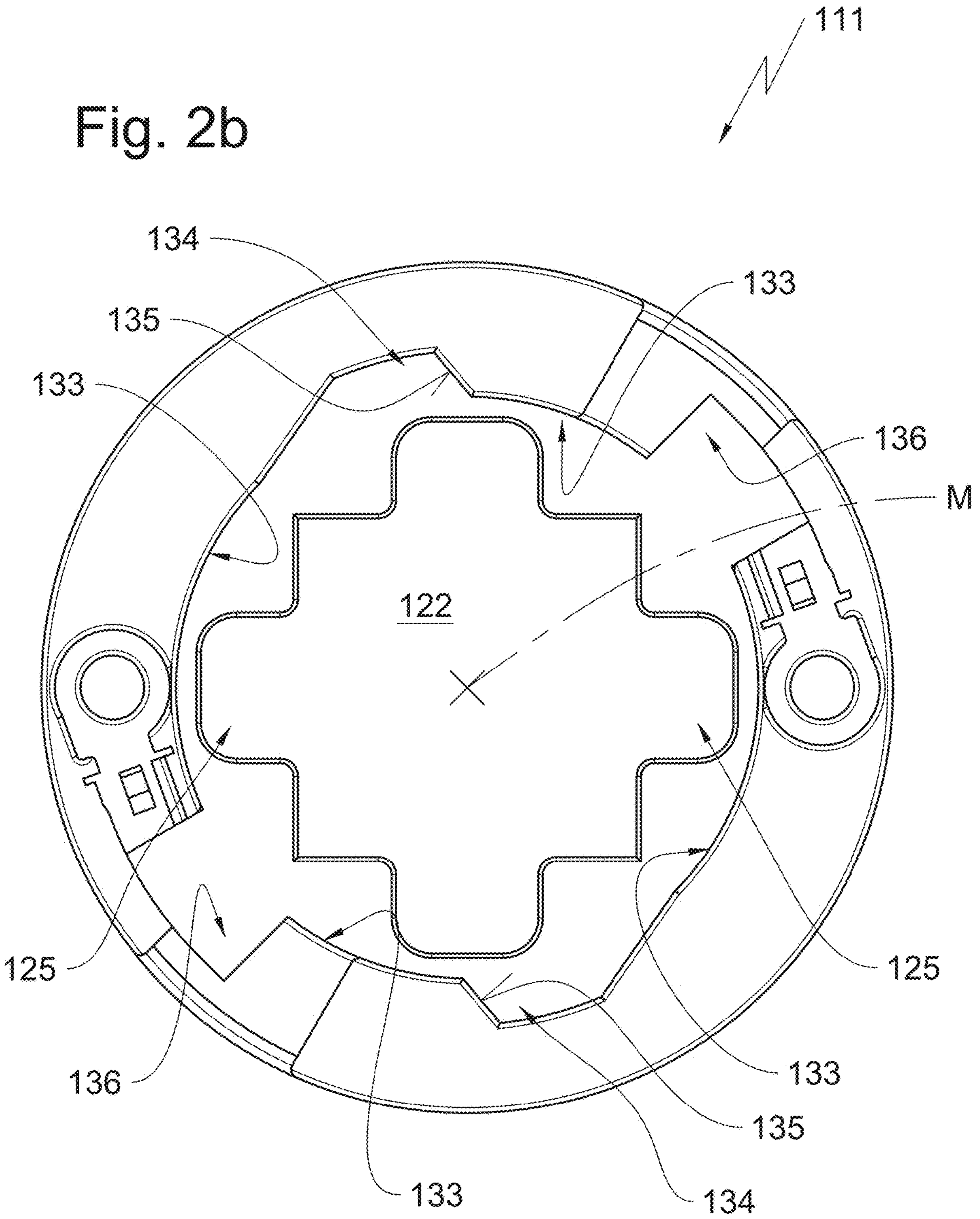
FIG. 2*b*: the first ring/outer ring according to FIG. 2*a* in a view from above.

FIG. 2*b*, the view from above of the first ring 111 according to FIG. 2*a*, clearly shows that the ring collar 126 has a substantially circular inner contour. However, the circular inner wall sections 133 of the ring collar 126 extending on a common radius around the centre point M are perforated by abutment recesses 134 located diametrically opposite one another. These have end abutment surfaces 135 formed by the inner circumferential wall of the ring collar 126.

The circular inner wall sections 133 of the ring collar 126, which extend on a common radius around the centre point M, are also perforated by diametrically opposite receptacles 136 for tension pins 137 of the second ring 112/the inner ring 112. The tension pins 137 will be discussed later. These receptacles 136 are arranged circumferentially offset to the abutment recesses 134.

Figure 2C:
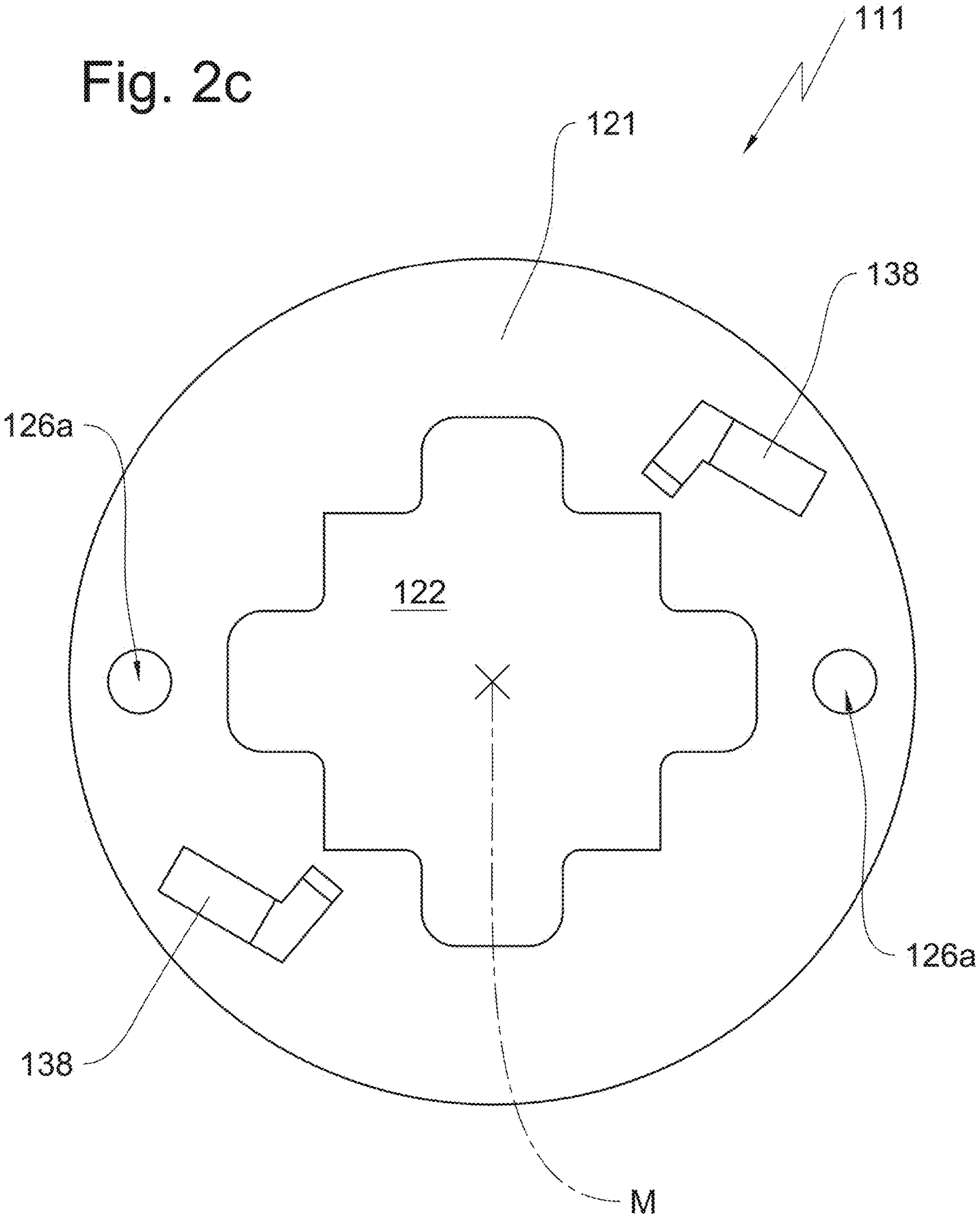
FIG. 2*c*: the first ring/outer ring according to FIG. 2*a* in a view from below without connection contacts.

In the view of the underside of the first ring 111/the outer ring 111 in FIG. 2*c*, it can be seen that it forms two connection chambers 138. In the exemplary embodiment, the connection chambers 138 are open in the direction of the heat sink 119/the counter bearing 118, i.e. counter to a light emission direction L of the LED 117, so that the connection contacts 113 (see FIG. 1) can be inserted there. The connection contacts 113 are held in the connection chamber 138, for example by frictional engagement or positive engagement, in particular by latching. The connection chambers 138 are then accessible for contacting with a supply contact, not shown, which is carried by the second ring 112/inner ring 112 in order to enter into an electrical connection with contact pads 139 of the LED circuit board 116 during the subsequent connection of the first ring 111 and the second ring 112.

Figure 3A:
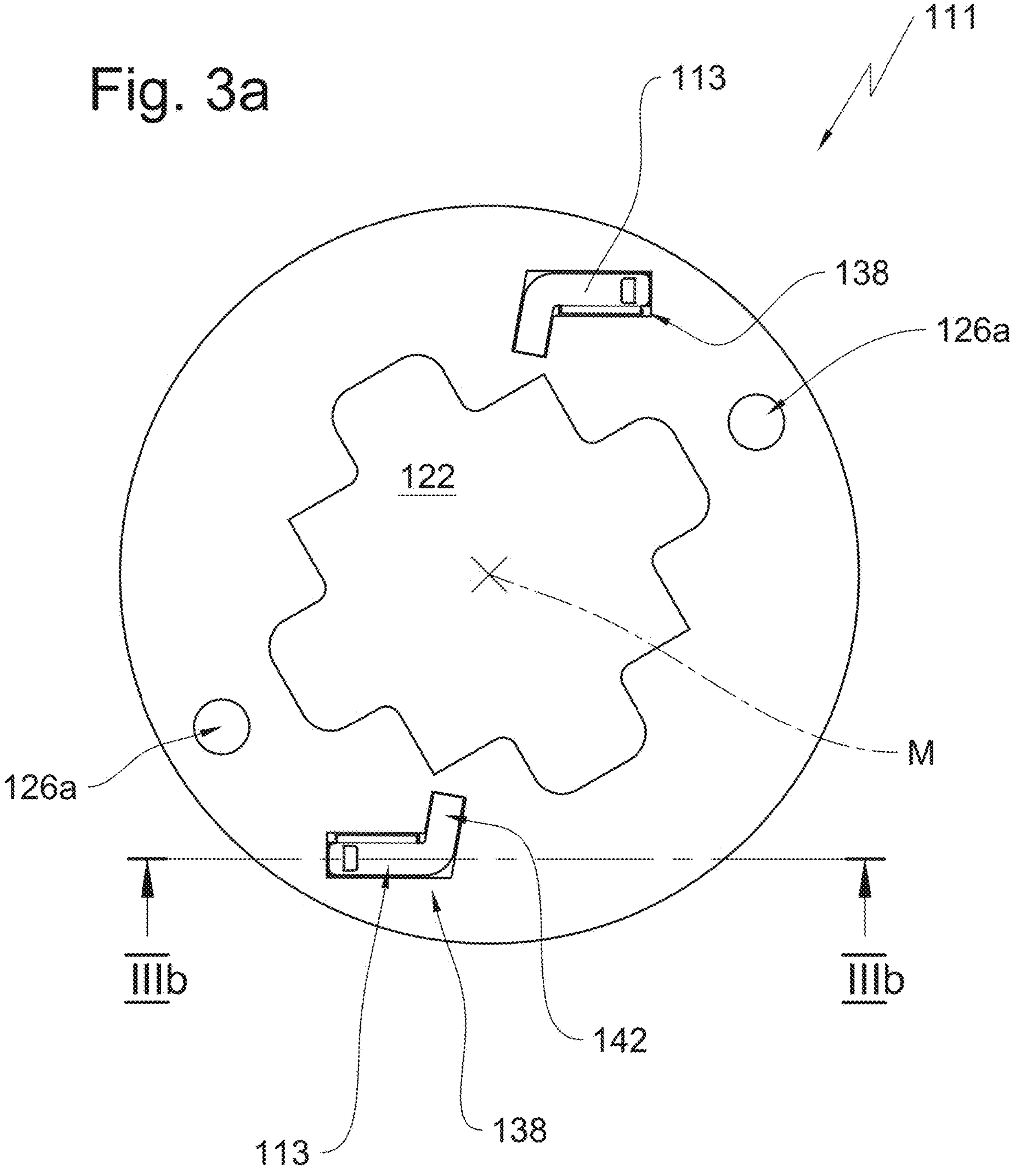
FIG. 3*a*: representation according to FIG. 2*a* with connection contacts.

FIG. 3*a* shows the representation of the first ring 111 as shown in FIG. 2*c*, i.e. viewed from below. In this representation, however, the connection contacts 113 are inserted into the connection chambers 138. It is conceivable that the underside of the outer ring 111 is provided with a sealing cover, not shown, after the connection contacts 113 have been assembled, in particular to protect the connection contacts 113 from touching the counter bearing 118 or heat sink 119. In this manner, it is ensured that no electrical connection can be entered into between the connection contacts 113 and the counter bearing 118. However, if the connection contacts 113 are sufficiently spaced apart from the counter bearing 118 and mounted in the connection chamber 138 so that they cannot be displaced, such a sealing cover is not necessary.

It should already be pointed out at this point that the first embodiment 100 provides for a structural separation of connection contacts 113 and a supply contact (not shown). Such a separation is due to the specific exemplary embodiment of the first embodiment, but is not absolutely necessary for the successful realisation of the connection element. It is easily conceivable that the connection contact 113 and the supply contact (not shown) form a uniform component which is supported either by the first ring 111 or by the second ring 112.

Figure 3B:
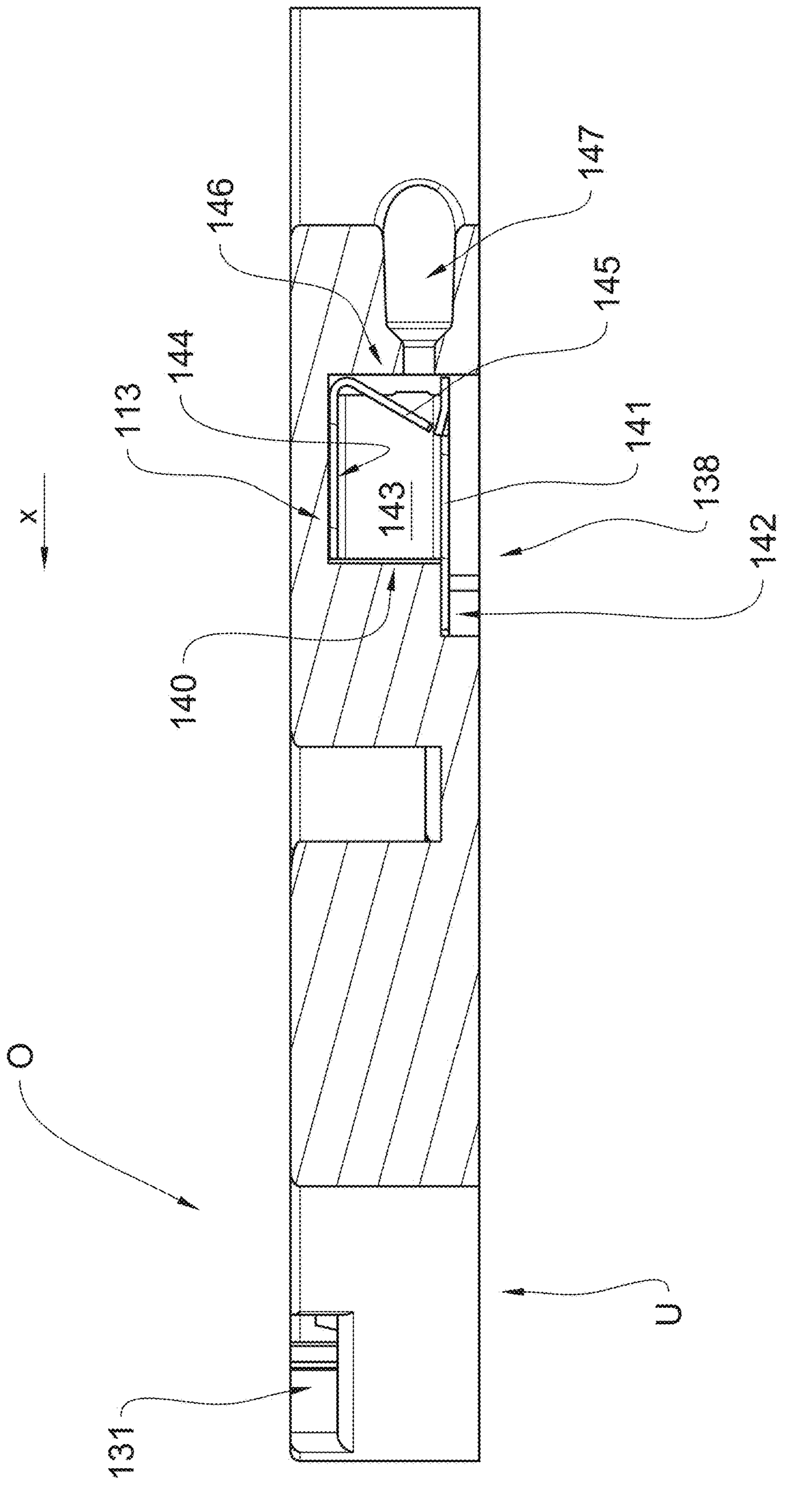
FIG. 3*b*: a sectional view of the first ring/outer ring corresponding to section line III B-III B in FIG. 3*a;*

FIG. 3*b* shows a sectional view according to section line III B-III B in FIG. 3*a*. The section line is placed through the connection contact 113 so that its structure for connecting a connection lead (not shown) can be explained. The connection contact 113 has a contact cage 140, the bottom of which is formed by a contact bar 141. The contact bar 141 forms a contact extension 142 (see FIG. 3*a*), which is used for the electrical connection with the supply contact (not shown). A contact side wall 143 carries a contact cover 144, from which a clamping leg 145 projects. The contact side wall 143 connects the contact bar 141 and the contact cover 144. The clamping leg 145 is arranged on the opposite side to the contact extension 142. The clamping leg 145 is located in the contact input 146, which is arranged downstream of a connection channel 147 formed by the outer ring 111 in the lead plug-in direction X.

The sectional view then shows the connection chamber 138 open towards the underside U of the first ring 111. The countersinking of the ring collar 126 open towards the upper side O to form the wall hook receptacle 131 can then be seen.

Figure 4:
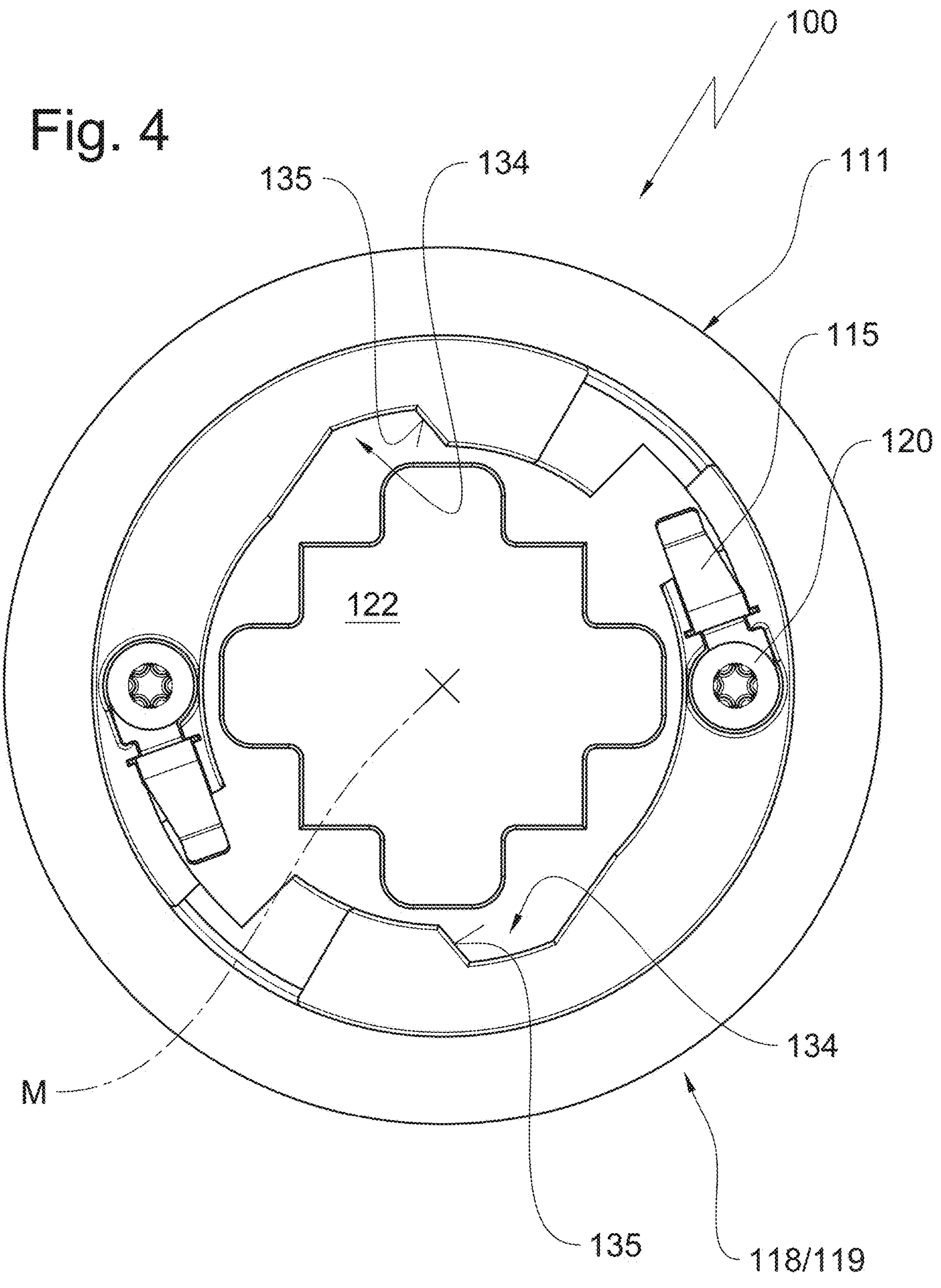
FIG. 4: a view from above of the installed first ring/outer ring omitting the heat sink.

FIG. 4 now shows a view from above of the assembled first ring 111. The screw bolts 120 engage through the respective retaining section 127 of the tension springs 115, which are inserted in the receiving holes 126*a*. The screw bolts 120 engage in threaded receptacles (not labelled) of the heat sink 119 and thus anchor the first ring 111 on the heat sink 119.

FIG. 4 is an example of one possibility for the desired pre-assembly. This structural unit, which is not yet fitted with an LED circuit board 116, can be kept in stock as a universal part for a specific type of luminaire so that it can be fitted with the LED circuit board to be used to customise the luminaire when an order is placed.

Figure 5A:
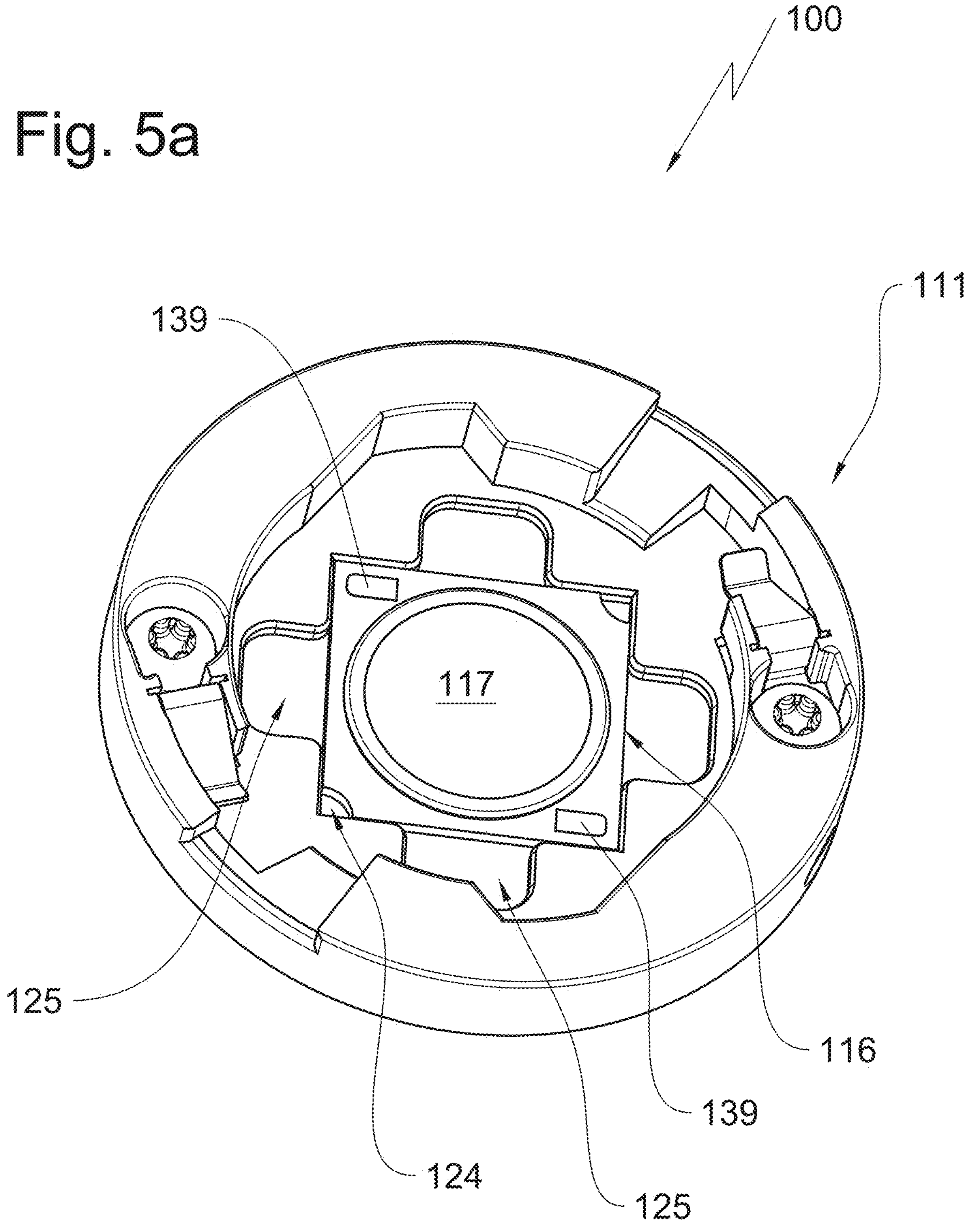
FIG. 5*a*: a perspective view of the first ring/outer ring from above with the inserted LED circuit board and omitting the heat sink.

FIG. 5*a* shows the assembled first ring 111 in a perspective view of its upper side. The heat sink 119 is not shown for clarity purposes. In FIG. 5*a*, the LED circuit board 116 has been inserted into the outer ring 111 within the context of the final assembly of a luminaire. It is obvious here that the insert contour 124 is adapted to the size of the circuit board 116. Via the engagement contours 125, it is possible to remove the LED circuit board 116 both by means of a removal tool (not shown) and without tools.

In the context of the first exemplary embodiment 100, the insert contour 124 is adapted to the largest LED circuit board 116 to be received. Smaller LED circuit boards or even differently shaped LED circuit boards can be used by inserting an adapter frame, not shown in the first exemplary embodiment 100, into the insert contour 124, the inner contour of which in turn receives the outer contour of the different LED circuit board 116. In this manner, the outer ring 111 is designed as a universal component for a large number of LED circuit boards 116. In deviation from this description, it is conceivable that the insert contour 124 has not undergone any adaptation to an LED circuit board 116, but is merely designed to receive adapter frames, which are then each associated with an LED circuit board 116.

Figure 5B:
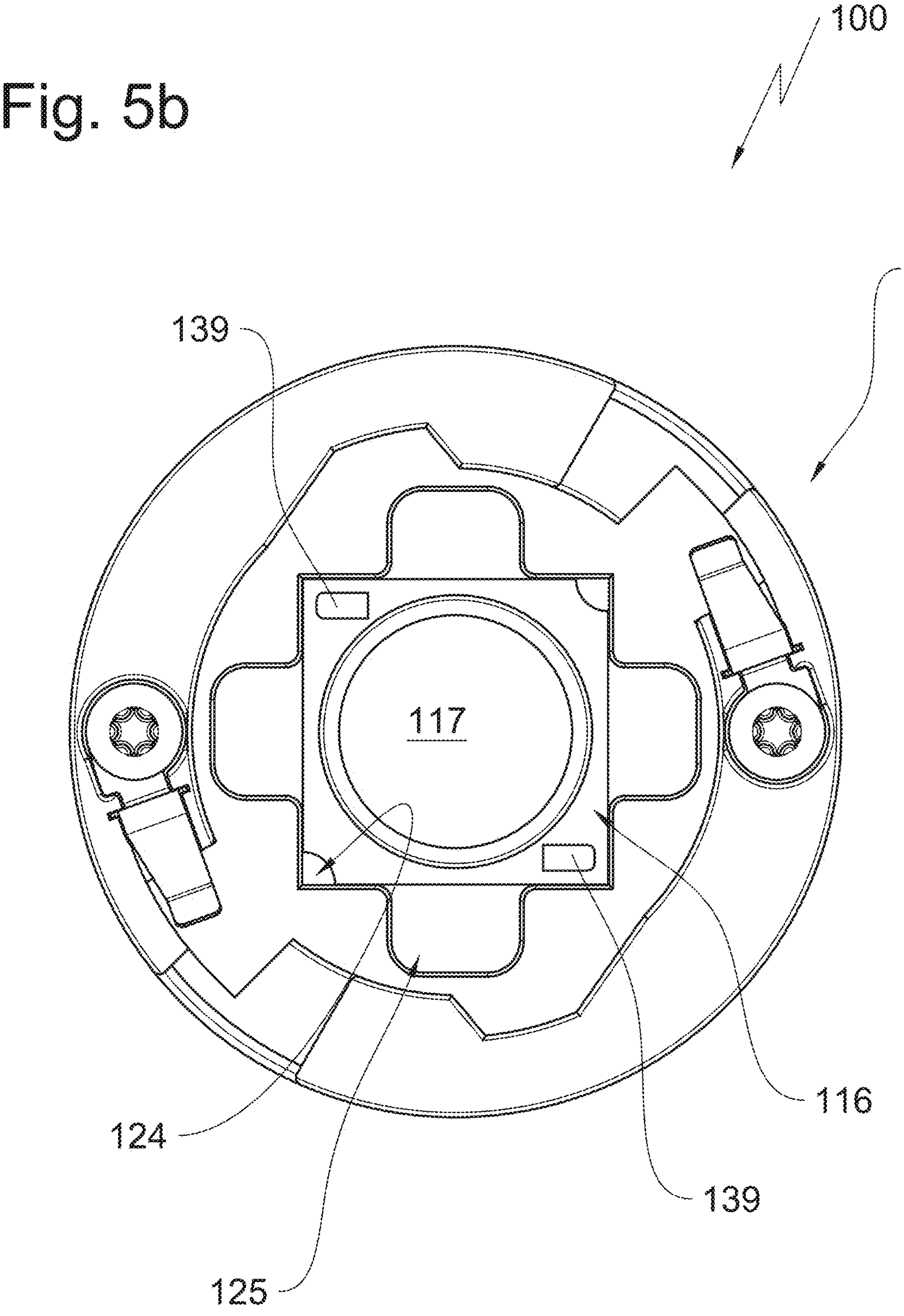
FIG. 5*b*: the view from above of the first ring/outer ring according to FIG. 5*a;*

FIG. 5*b* shows a top view of the situation described in FIG. 5*a*. It can be seen from this view that the LED circuit board 116 is held virtually free of play by the insert contour 124 in the direction parallel to its bearing surface on the counter bearing 118. In the exemplary embodiment, a certain amount of fitting tolerance is provided in order to insert the LED circuit board 116 into the insert contour 124. However, it is conceivable to achieve a frictional or positive fit by means of latching elements or spring elements, which are preferably formed with a uniform material fit with the first ring 111, in particular with its bottom plate 121.

Figure 6A:
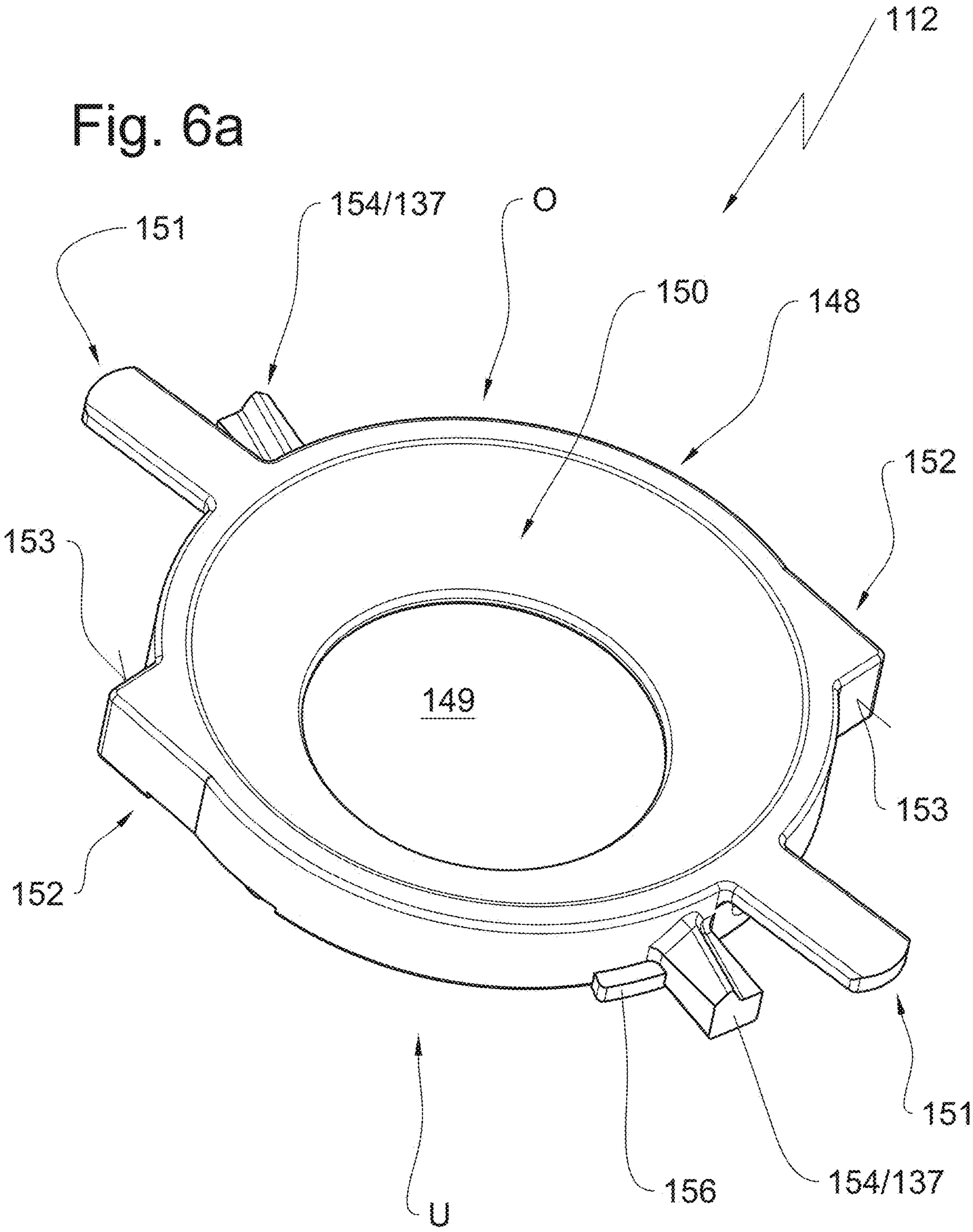
FIG. 6*a*: a perspective view from above of the second ring/inner ring of the first embodiment according to FIG. 1.

FIG. 6*a* shows the inner ring 112, i.e. the second ring 112 of the connection element 110 of the first embodiment 100 in perspective view on the upper side.

The inner ring 112 is formed by a ring wall 148 which surrounds a central LED recess 149. The ring wall 148 slopes down from its upper side O towards its lower side U, so that the LED recess 149 is surrounded by a funnel-shaped recessed ring wall section 150. The funnel-shaped recessed ring wall section 150 prevents light shading of the light emitted by the LED 117.

The outer circumference of the ring wall 148 is substantially circular. It bears outwardly projecting actuating handles 151, which are set diametrically opposite one another and serve to anchor the inner ring 112 in the outer ring 111 by means of a locking movement.

Also projecting outwards and again arranged diametrically opposite one another, the ring wall 148 forms abutment elements 152. Each abutment element 152 has an abutment surface 153, which is aligned parallel to a light emission direction L or vertically with respect to the mounting surface of the LED circuit board 116 on the counter bearing 118. Each abutment surface 153 interacts with an end abutment surface 135 of the abutment recesses 134 of the outer ring 111 (see FIG. 2*b* and FIG. 4).

Next, the ring wall 148 carries on its outer circumference two diametrically opposite tension receiving elements 154 projecting outwards from the ring wall 148. These tension receiving elements are specifically designed as tension pins 137. The tension receiving elements 154 or tension pins 137 interact with the tension springs 115, in particular their tension spring arms 129, in order to tension the inner ring 112 against the LED circuit board 116. The tension force thus acts in the insertion direction E of the LED circuit board 116 into the outer ring 111 or counter to the light emission direction L.

Finally, in the first embodiment 100, the inner ring 112 carries on its outer circumference and again projecting outwards two locking elements 155 which are diametrically opposite each other. In the present embodiment, the locking element 155 serves as a coupling part in order to attach the inner ring 112 to the outer ring 111. Each locking element 155 is designed as a locking web 156, which extends in the circumferential direction of the inner ring 112.

As can be seen in FIG. 6*a*, the actuating handles 151, the abutment elements 152, the tension receiving elements 154 and the locking elements 155 are arranged circumferentially offset from one another.

Figure 6B:
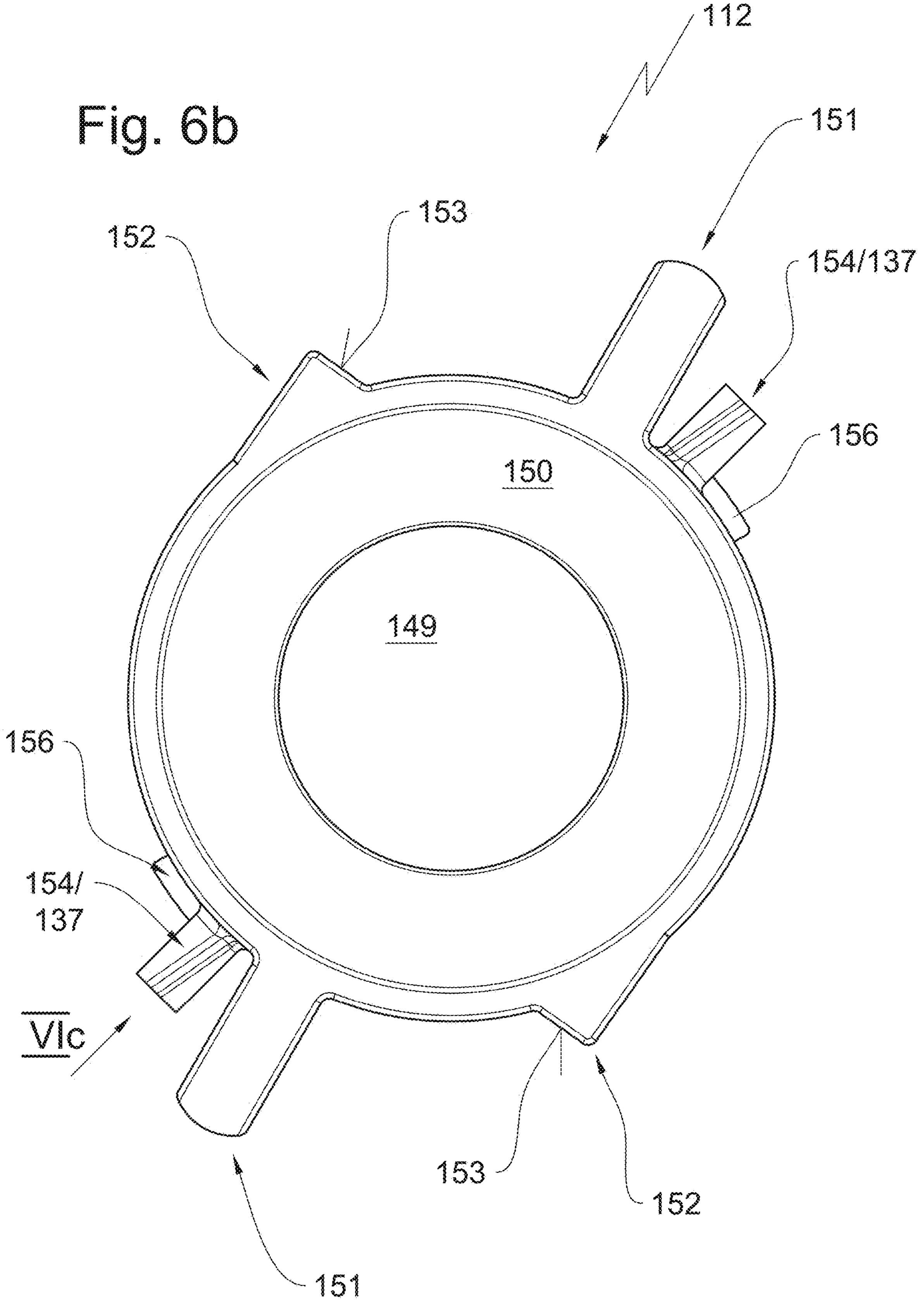
FIG. 6*b*: a view from above of the second ring/inner ring according to FIG. 6*a;*

FIG. 6*b* shows the situation described in FIG. 6*a* once again in a top view of the inner ring 112. This view clearly shows once again that the aforementioned components are actually arranged diametrically opposite one another and are circumferentially offset from one another.

Figure 6C:
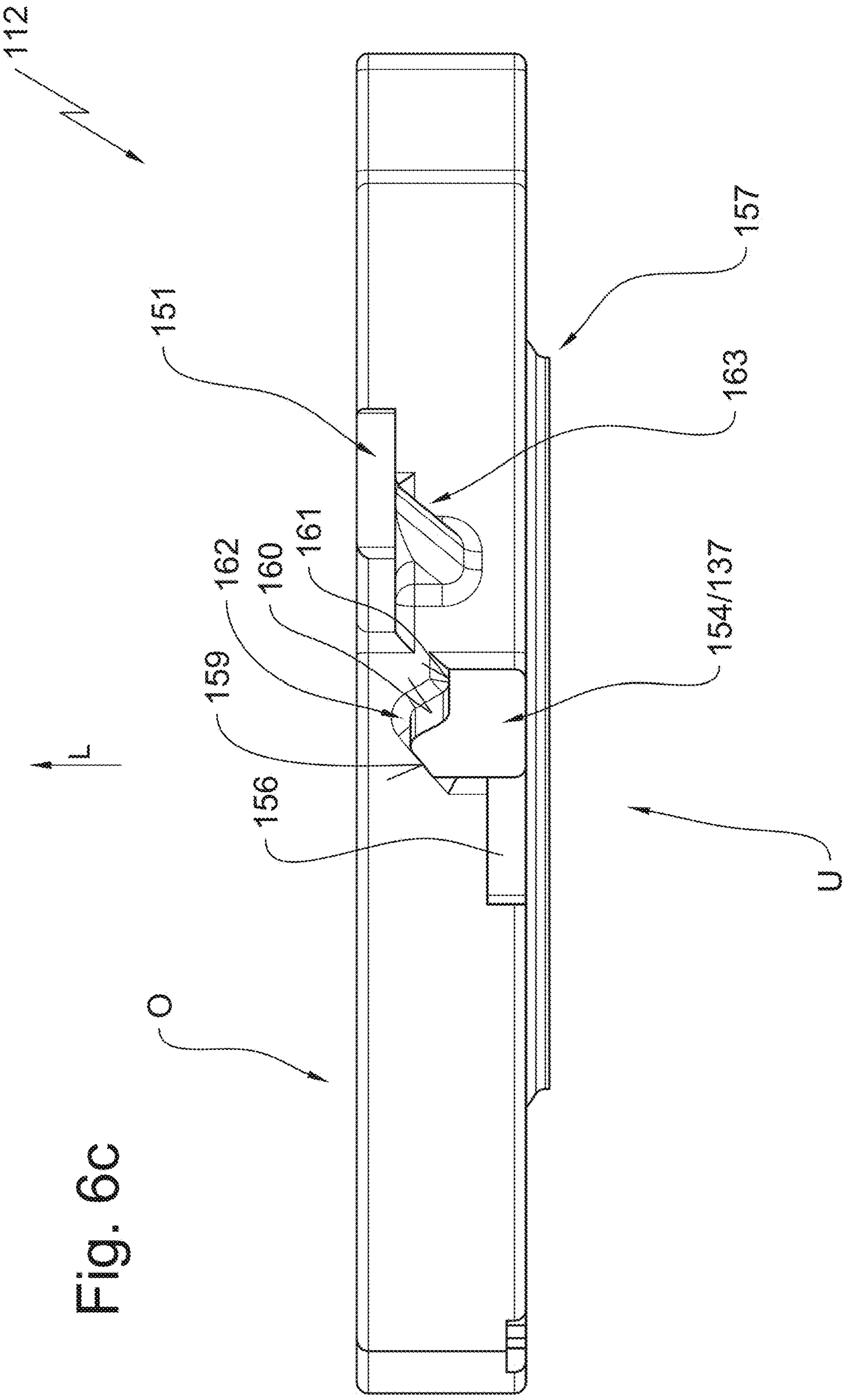
FIG. 6*c*: a side view of the second ring/inner ring according to arrow VI C in FIG. 6*b;*

FIG. 6*c* shows the inner ring 112 as shown by arrow VI C in FIG. 6*b*. It is noticeable that the inner ring 112 forms a collar projection 157 on its underside, which projects counter to the light emission direction L, i.e. in the direction of the counter bearing 118. This collar projection 157 surrounds the LED 117 and sits on the LED circuit board 116. In a preferred embodiment, it is manufactured with oversize and is elastically or plastically deformable. In this manner, manufacturing and material tolerances between the individual components of the connection element 110, the LED circuit board 116 and the counter bearing 118 can be compensated. A contact pressure exerted by the inner ring 112 on the LED circuit board 116 in the direction of the counter bearing 118 is thus ensured in every case. In this manner, optimum heat transfer from the LED circuit board 116 to the counter bearing 118 or to the heat sink 119 can be ensured.

In order to transfer the contact pressure via the inner ring 112 to the LED circuit board 116, the tension pins 137 of the inner ring 112 interact with the tension springs 115 (see FIG. 1). For this purpose—as will be explained later—the inner ring 112 is rotated in the locking direction R after it is inserted into the outer ring 111. As a result, the tension pins 137 shown in FIG. 6*c* run onto the tension springs 115, or more precisely onto the tension spring arms 129. Each tension spring arm 129 is initially—starting from the retaining section 127—designed to be inclined in the insertion direction E or in the direction of the counter bearing 118. The free end of the tension spring arms 129 is—as can be seen in particular in FIG. 1—bent upwards in the light emission direction L, i.e. pointing away from the counter bearing 118. As a result, each free end of the tension spring arms 129 forms an anchor lug 158.

The tension pin 137 is provided in the locking direction R extending with an inclined run-on surface 159, which extends in the direction of the upper side O of the inner ring 112. This is followed downstream in the locking direction R by a support surface 160 that slopes down towards the underside U and merges into a support surface 161 with an orientation parallel to the mounting surface, i.e. horizontal orientation. In this manner, the tension pin 137 forms an anchor projection 162, in particular via the inclined run-on surface 159 and the adjoining support surface 160.

Figure 7A:
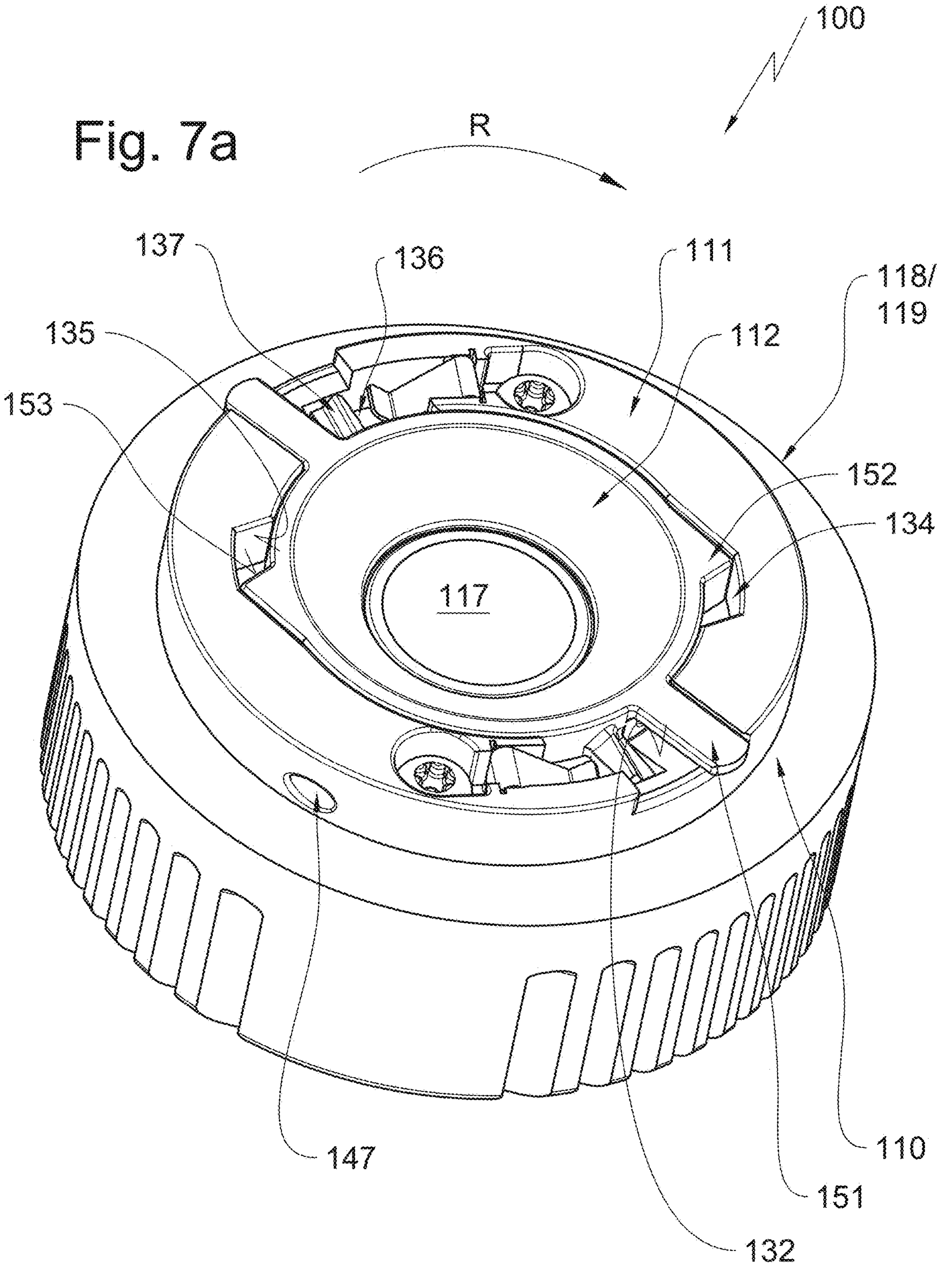
FIG. 7*a*: a perspective view of the first embodiment according to FIG. 1 in assembled form and with the second ring/inner ring in a released position.

FIG. 7*a* shows the first embodiment 100, as is shown in FIG. 1 as an exploded representation, in an assembled form. The heat sink 119 carries the outer ring 111 which is secured to the heat sink 119 by the screw bolts 120. The LED circuit board 116 is inserted into the outer ring 111. The inner ring 112 is placed onto the LED circuit board 116 and receives the LED 117 in its LED recess 149.

The actuating handles 151 sit in the wall hook receptacles 131, wherein the centring webs 163 (see FIG. 6*c*) on the underside of the actuating handles 151 interact with the centring surfaces 132. The tension pins 137 are inserted into the receptacles 136 provided for this purpose. The abutment elements 152 are inserted into the abutment recesses 134, wherein the abutment surfaces 153 and the end abutment surfaces 135 are spaced apart from each other.

In FIG. 7*a*, the inner ring 112 is located in its released position, i.e. it is not yet anchored in the outer ring 111. In this position it can be easily removed from the outer ring 111 in the light emission direction L. In order to anchor the inner ring 112 in the outer ring 111, a rotation in the locking direction R is now required, which will be discussed later.

Figure 7B:
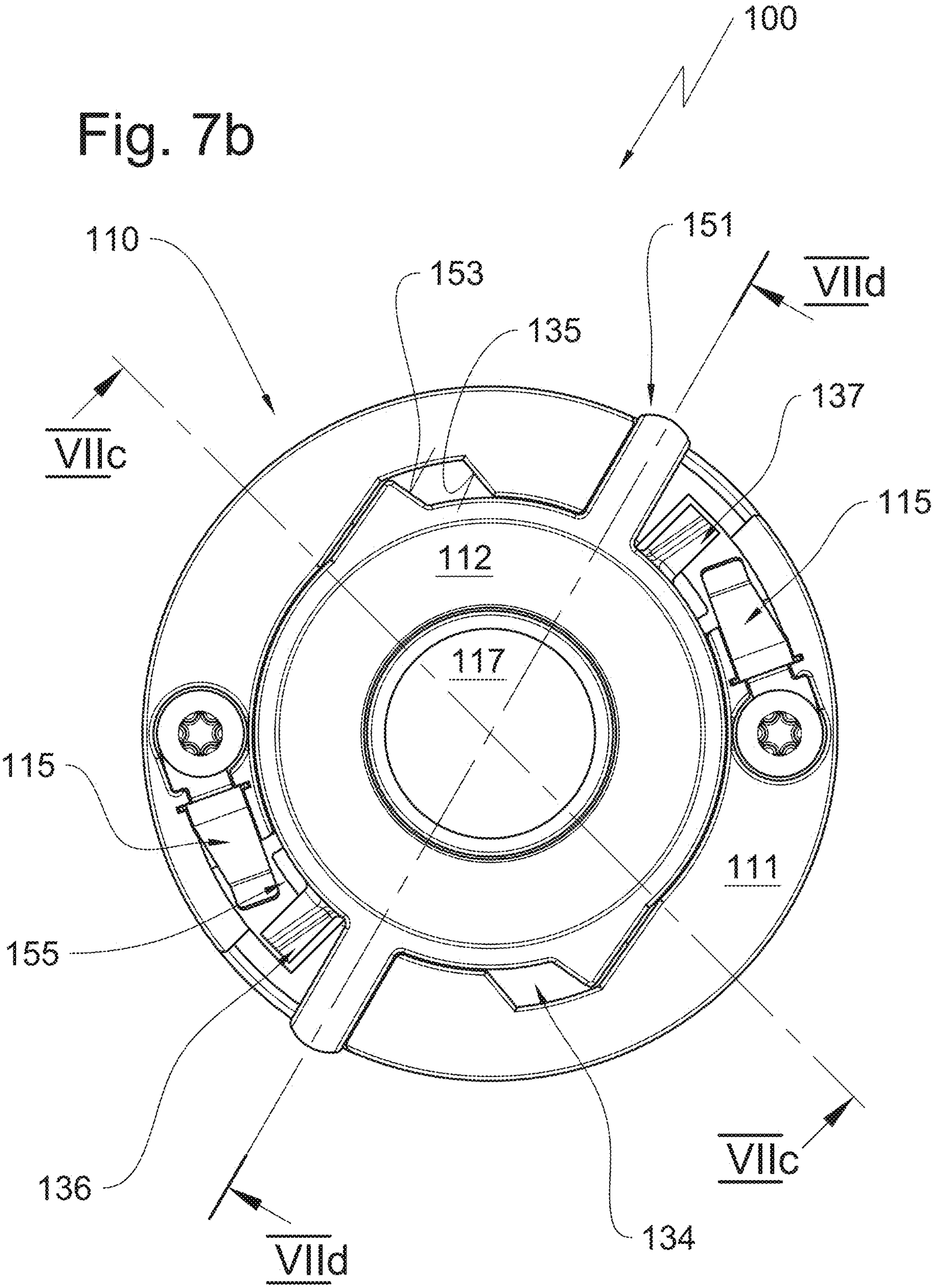
FIG. 7*b*: the representation according to FIG. 7*a* in a view from above without the heat sink.

FIG. 7*b* shows the representation according to FIG. 7*a* in a perspective view from above, wherein the heat sink 119 is not shown here for clarity.

Figure 7C:
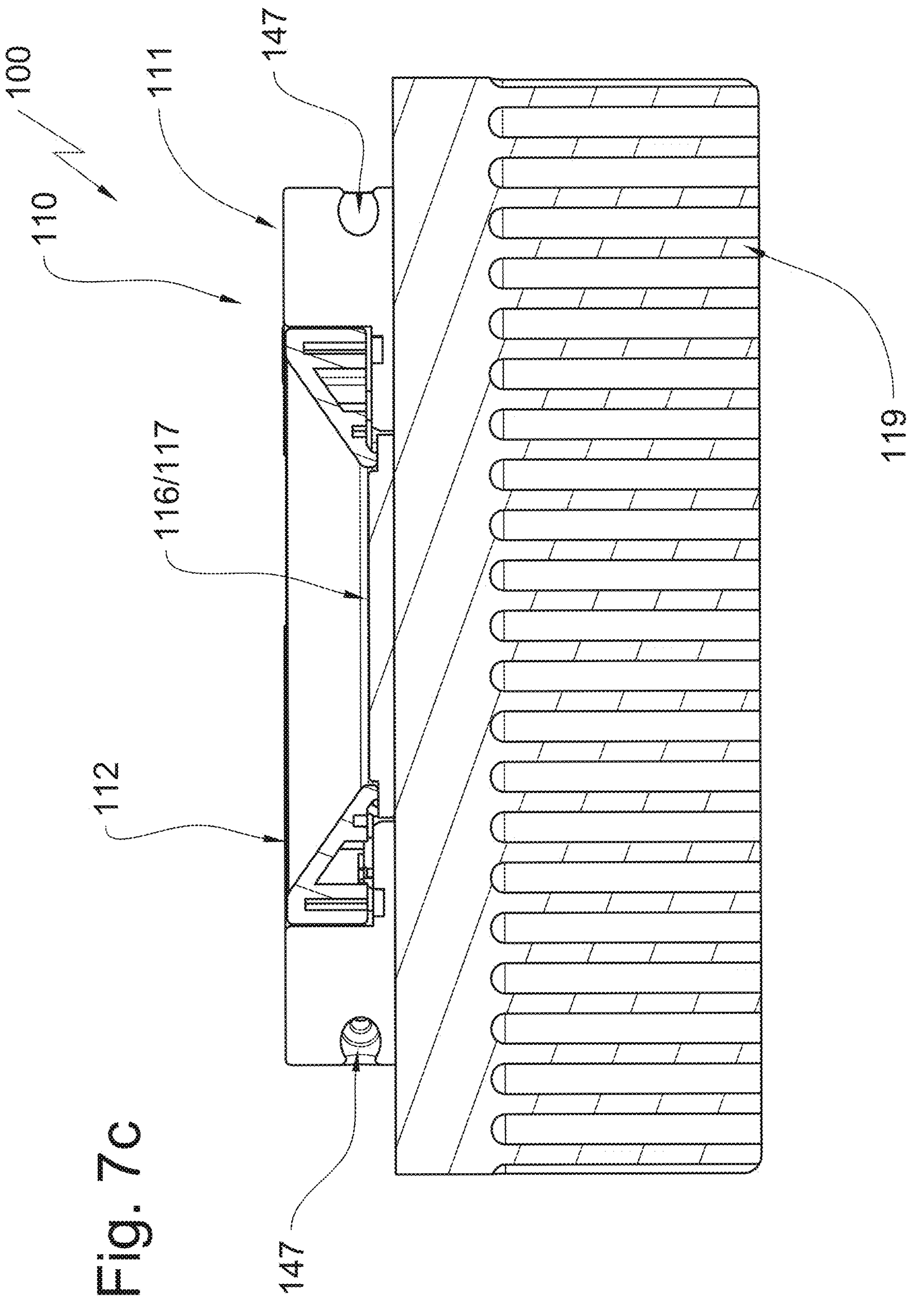
FIG. 7*c*: a sectional representation according to section line VII C-VII C in FIG. 7*b* inclusive of the heat sink.

FIG. 7*c* is a sectional view through the first embodiment 100 according to section line VII C-VII C in FIG. 7*b*. In contrast to FIG. 7*b*, in this sectional view the heat sink 119 is shown. It can be taken from this representation how the outer ring 111 surrounds the LED circuit board 116 and how the LED circuit board 116 is overlapped by the second ring 112. In particular, FIG. 7*c* shows how the collar projection 157 surrounds the LED 117 and sits on the upper side, i.e. the side of the circuit board 116 facing away from the heat sink 119. The LED circuit board 116 is placed on the heat sink 119. This results in full-surface contact between the underside of the LED circuit board 116 and the contact surface of the heat sink 119, so that good heat transfer from the circuit board 116 to the heat sink 119 is ensured. The two connection channels 147 in the outer ring 111 can also be seen, which extend into the connection chambers 138 (not shown here) and are used to insert connection leads (not shown) into the respective connection contact 113.

Figure 7D:
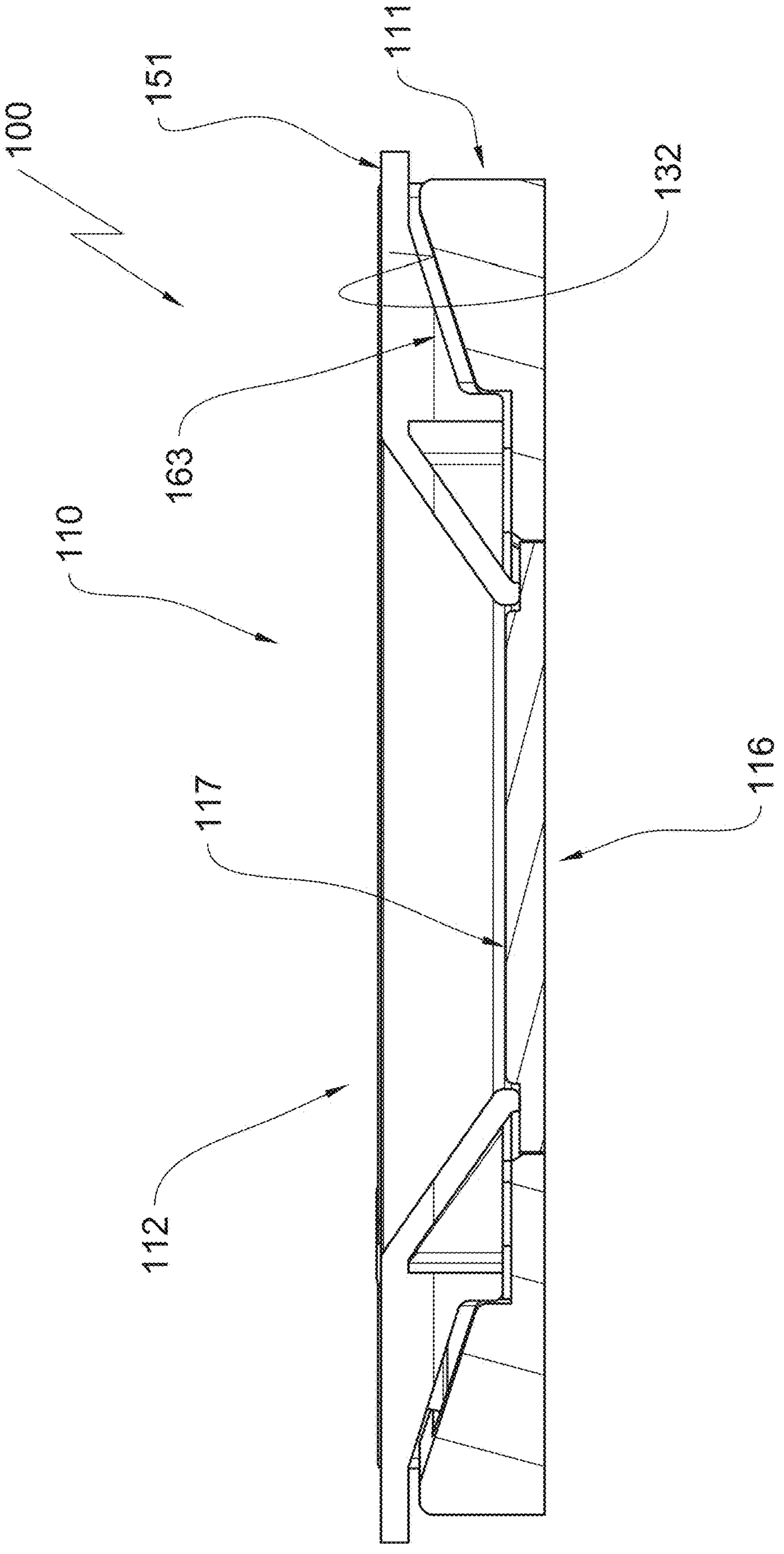
FIG. 7*d*: a sectional representation according to section line VII D-VII D in FIG. 7*b* without the heat sink.

FIG. 7*d* shows a sectional view through the first embodiment 100 and in particular through the connection element 110 there, along the section line VII D-VII D in FIG. 7*b*. There, the interaction of the centring surfaces 132 of the outer ring 111 and the centring webs 163 of the actuating handle 151 is schematically shown. Both surfaces are designed to slope towards the centre point M of the outer ring 111 and towards the LED circuit board 116 or the heat sink 119, not shown, and slide over each other when inserting the inner ring 112 into the outer ring 111. In this manner, it is ensured that the inner ring 112 is already coaxially oriented substantially centred during insertion into the outer ring 111.

Figure 8A:
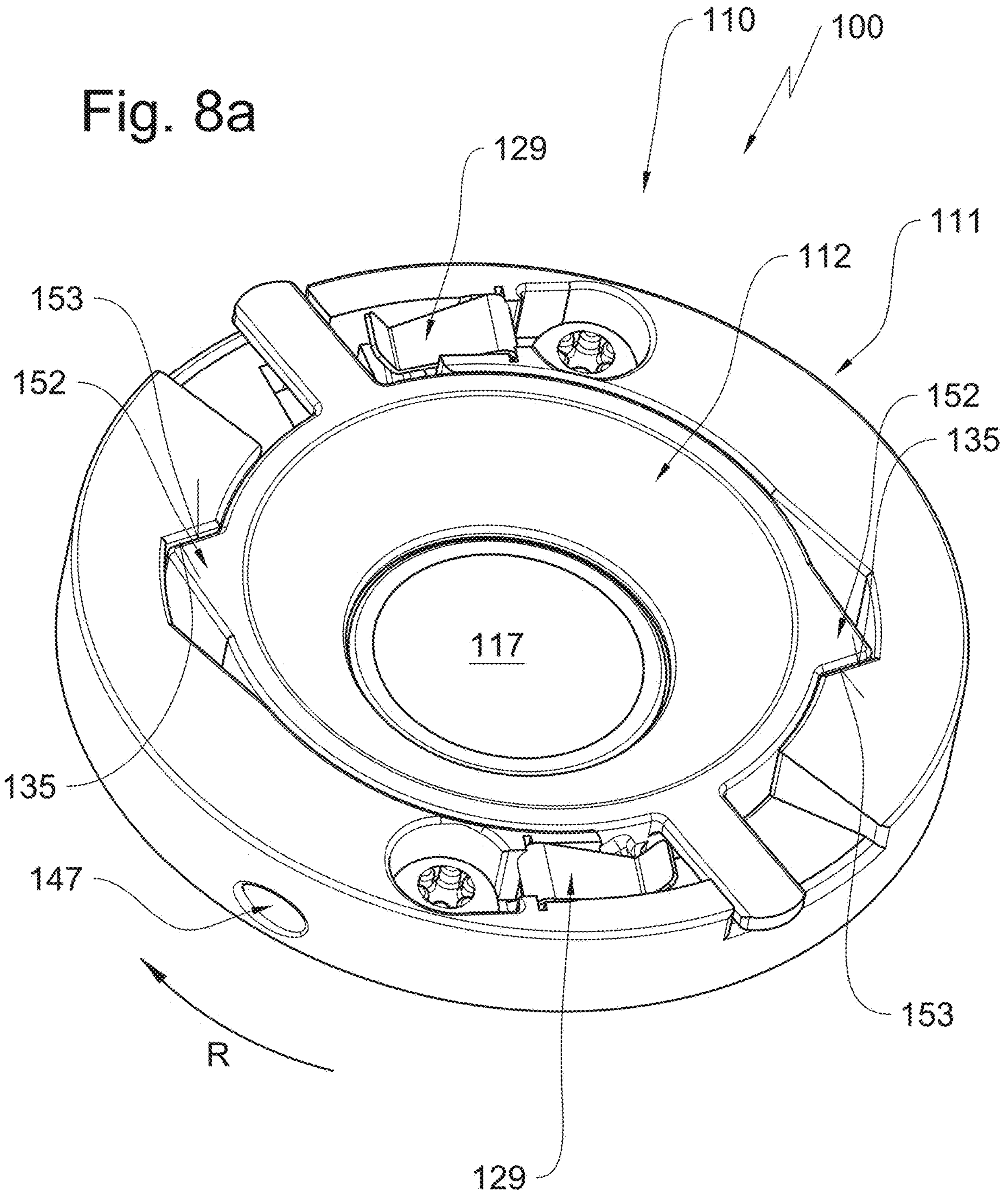
FIG. 8*a*: the first embodiment according to FIG. 1 in assembled form with the inner ring in the locked position and without showing the heat sink.

FIG. 8*a*, analogous to FIG. 7*a*, shows a perspective representation of the assembled first embodiment 100, wherein the heat sink 119 is not shown here for clarity purposes. In contrast to FIG. 8*a*, the inner ring 112 has been moved in the locking direction R into its locking position. The locking movement comes to an end when abutment surfaces 153 of the abutment elements 152 of the inner ring 112 abut onto the end abutment surfaces 135 of the abutment recesses 134 of the outer ring 111. FIG. 8*a* already gives an idea of how the tension pins 137 come under the tension spring arms 129 of the tension springs 115 due to the locking movement in the locking direction R. This alone can already mechanically fix the inner ring 112 in the outer ring 111, so that no further retaining parts on the part of the first ring 111 or no coupling part on the part of the second ring 112 would be required.

Figure 8B:
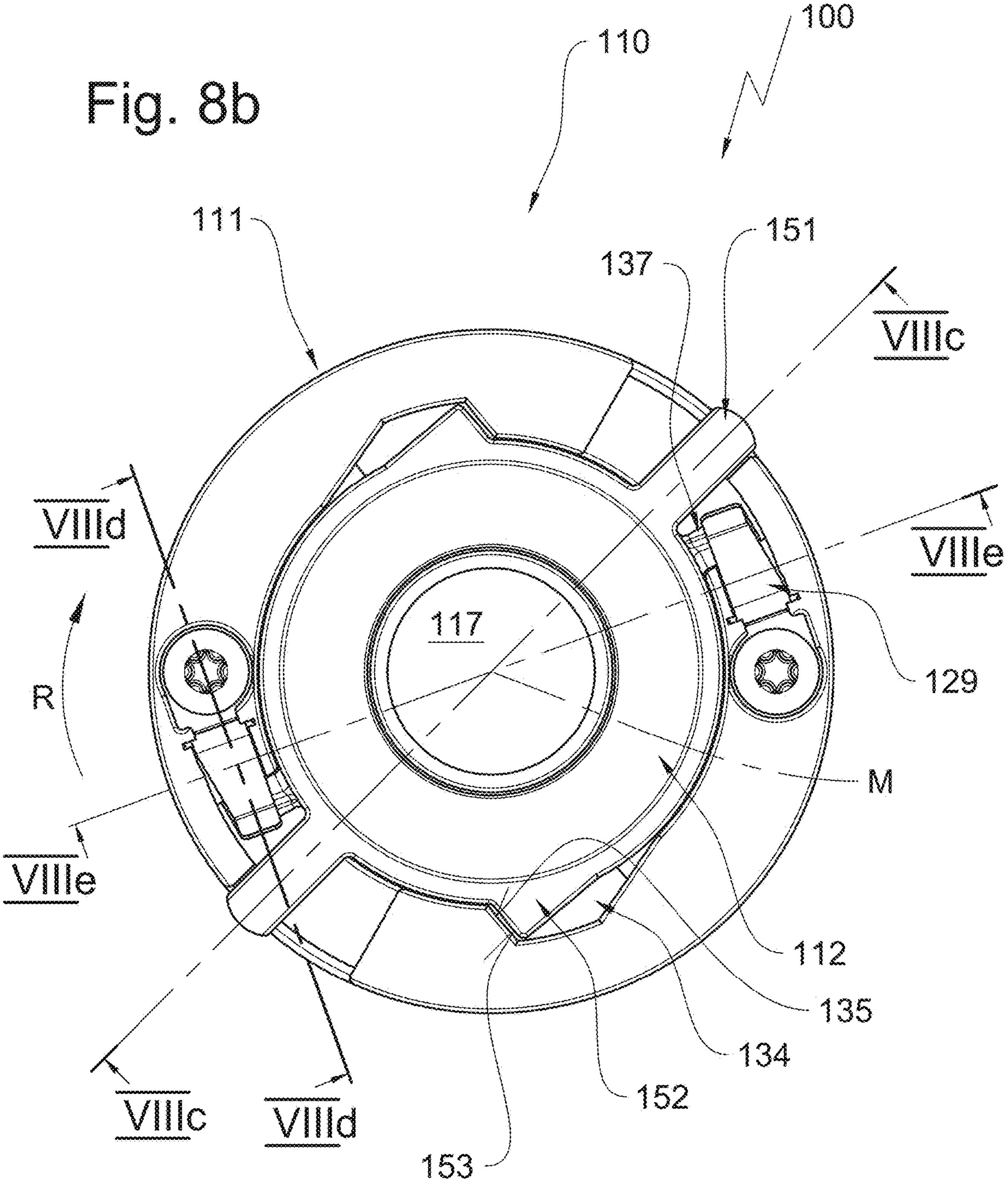
FIG. 8*b*: the representation according to FIG. 1 in a view from above.

FIG. 8*b* shows the representation according to FIG. 8*a* in a view from above. Also here, the situation just described for FIG. 8*a* is shown again.

Figure 8C:
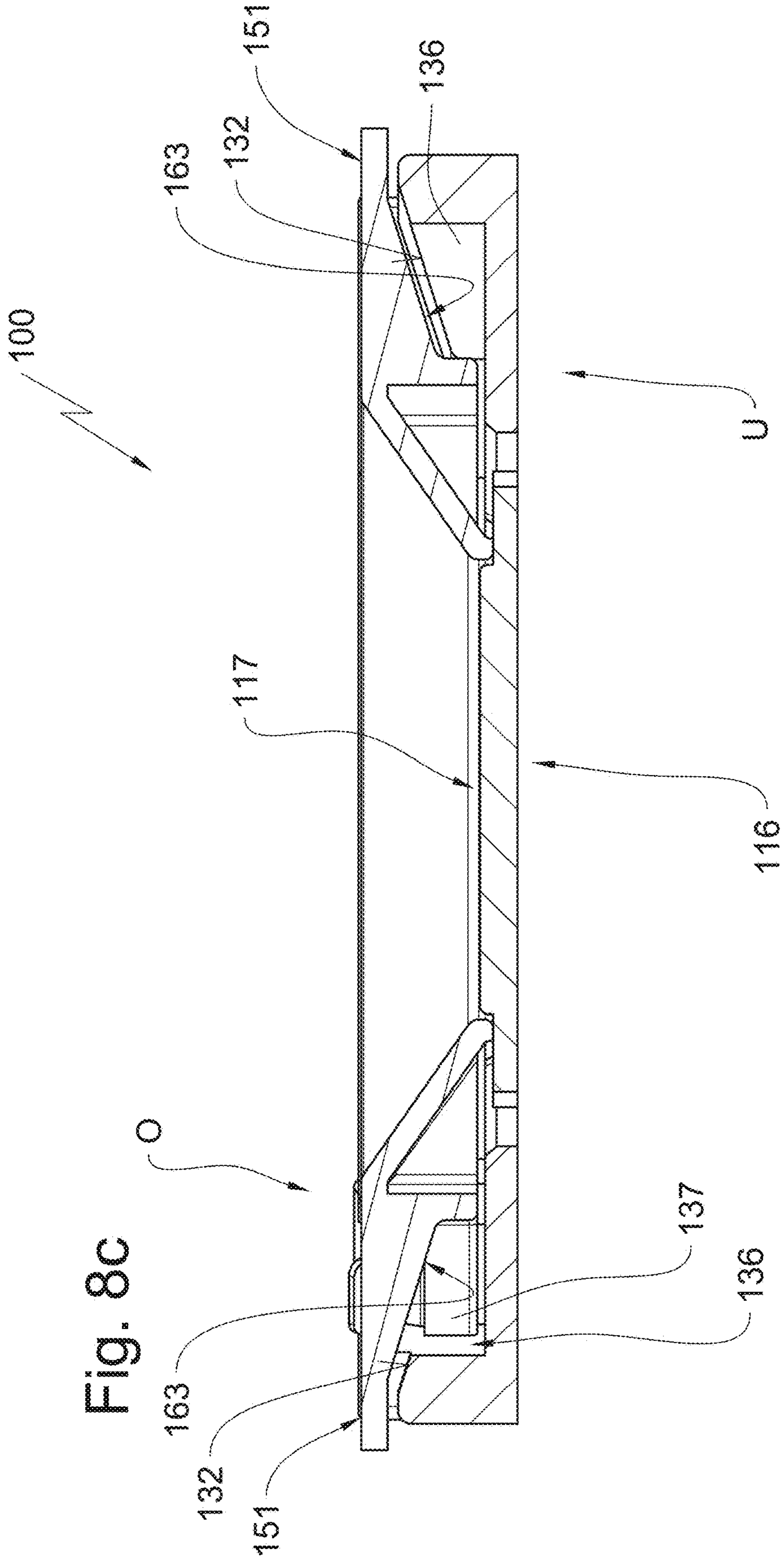
FIG. 8*c*: a sectional representation according to section line VIII C-VIII C in FIG. 8*b;*

FIG. 8*c* is a sectional view through the first embodiment 100 according to section line VIII C-VIII C in FIG. 8*b*. Also here, the heat sink 119 has not been shown for clarity purposes. It can be seen from this figure—particularly when looking at the left-hand side of the drawing—that as a result of the rotation of the inner ring 112 in the locking direction R, the actuating handles 151 are now arranged in the area of the receptacles 136 for the tension pin 137, whereas the tension pin 137 has been moved further in the locking direction R, i.e. to the rear with respect to the drawing plane of FIG. 8*c*.

Figure 8D:
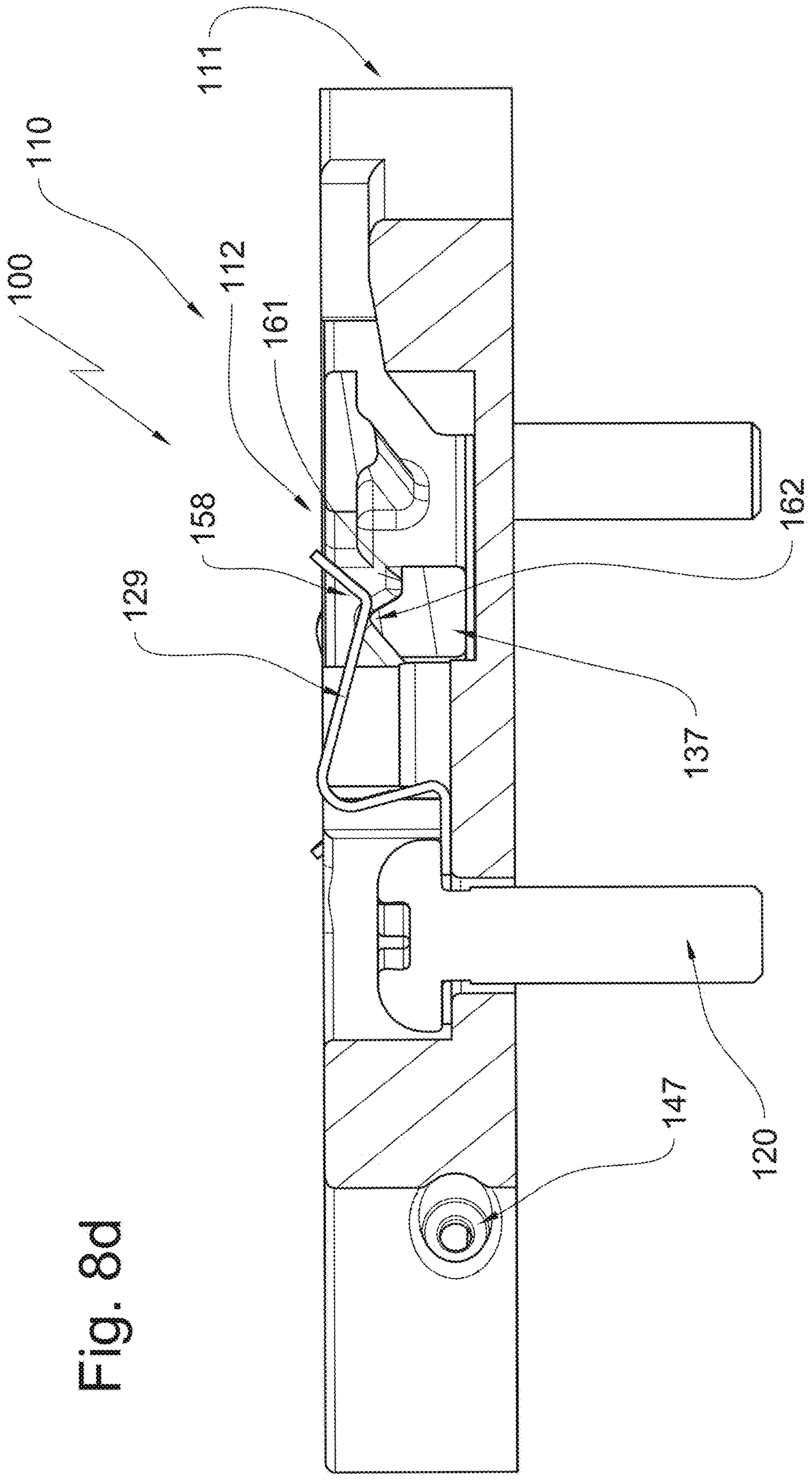
FIG. 8*d*: a sectional representation according to section line VIII D-VIII D in FIG. 8*b;*

FIG. 8*d* shows a sectional view of the first embodiment along the section line VIII D-VIII D in FIG. 8*a*. This representation shows how the tension pin 137 sits in the locking position of the inner ring 112 under the tension spring arm 129 of the tension spring 115. During the locking process, the anchor lug 158 performs an overstroke movement. With this the anchor lug 158 glides over the anchor projection 162. In the locking position of the inner ring 112, the anchor lug 158 sits on the bearing surface 161 of the tension pin 137 and presses the inner ring 112 against the LED circuit board 116. In this manner, a contact pressure is ensured between the LED circuit board 116 and the bearing surface of the counter bearing 118 or the heat sink 119, which optimises the heat transfer from the LED circuit board 116 to the heat sink 119.

Figure 8E:
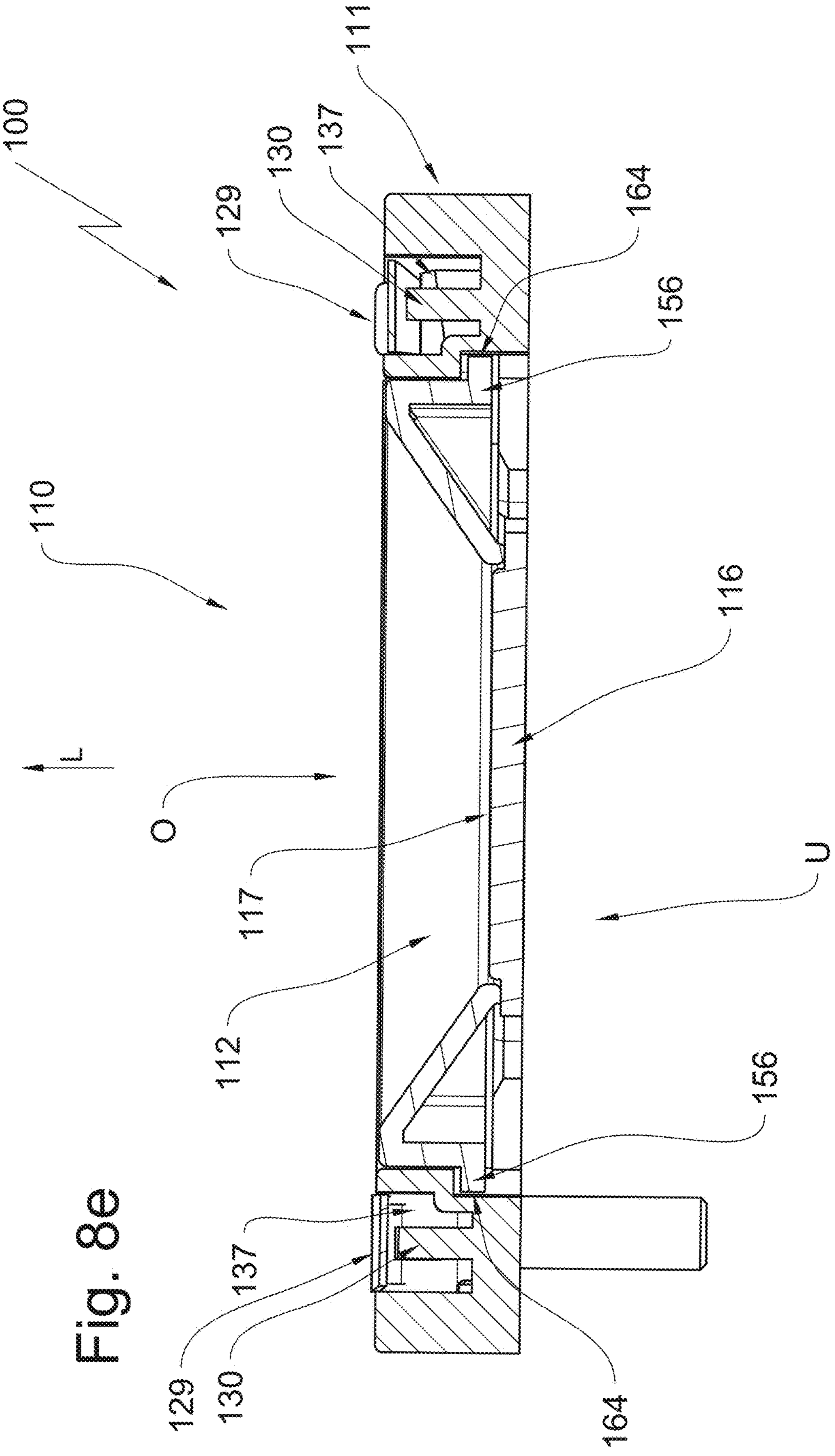
FIG. 8*e*: a sectional representation according to section line VIII E-VIII E in FIG. 8*b;*

FIG. 8*e* is a sectional view of the first embodiment 100 according to section line VIII E-VIII E in FIG. 8*b*. As in the other FIGS. 8*a* to 8*d*, the heat sink is not shown here for clarity purposes.

FIG. 8*e* shows that the tension pins 137 have been moved under the tension spring arms 129 by the rotation in the locking direction R. Here, the tension spring arms 129 were deflected upwards, creating a return tension, and thus now exert a tension force on the inner ring 112 counter to the light emission direction L in the direction of the heat sink 119 (not shown).

As has been explained above, a mechanical attachment of the inner ring 112 in the outer ring 111 is possible only by pushing the tension pins 137 below the tension spring arms 129. However, in the first embodiment 100, shown here, the design takes another approach. As already noted above in the description of the inner ring 112, the inner ring 112 has coupling parts in the form of locking webs 156.

The inner wall sections 133 form locking chambers 164 in a region arranged downstream in the locking direction R of the receptacle 136. These locking chambers 164 are open in the direction of the centre of the outer ring 111 or, in other words, form an entry in the direction of the outer circumference of the outer ring 111. As the tension pins 137 are moved under the tension spring arms 129 in the manner of a bayonet lock when the inner ring 112 is moved in the locking direction R, the locking elements 155 of the inner ring 112 also enter the locking chambers 164 in the manner of a bayonet lock.

As a result, in the first exemplary embodiment 100 of the connection element shown here, a positive-locking attachment of the inner ring 112 in the outer ring 111 has been selected by the interaction of the locking elements 155 and the locking chambers 164.

In FIGS. 9 to 15*d*, a second embodiment 200 of the connection element is shown. As already explained above, a number of components are identical or act identically to corresponding components of the first embodiment 100. Correspondingly, the reference numerals are selected in the number range 200, but in the tens place they are identical between the first embodiment 100 and the second embodiment 200.

Figure 9:
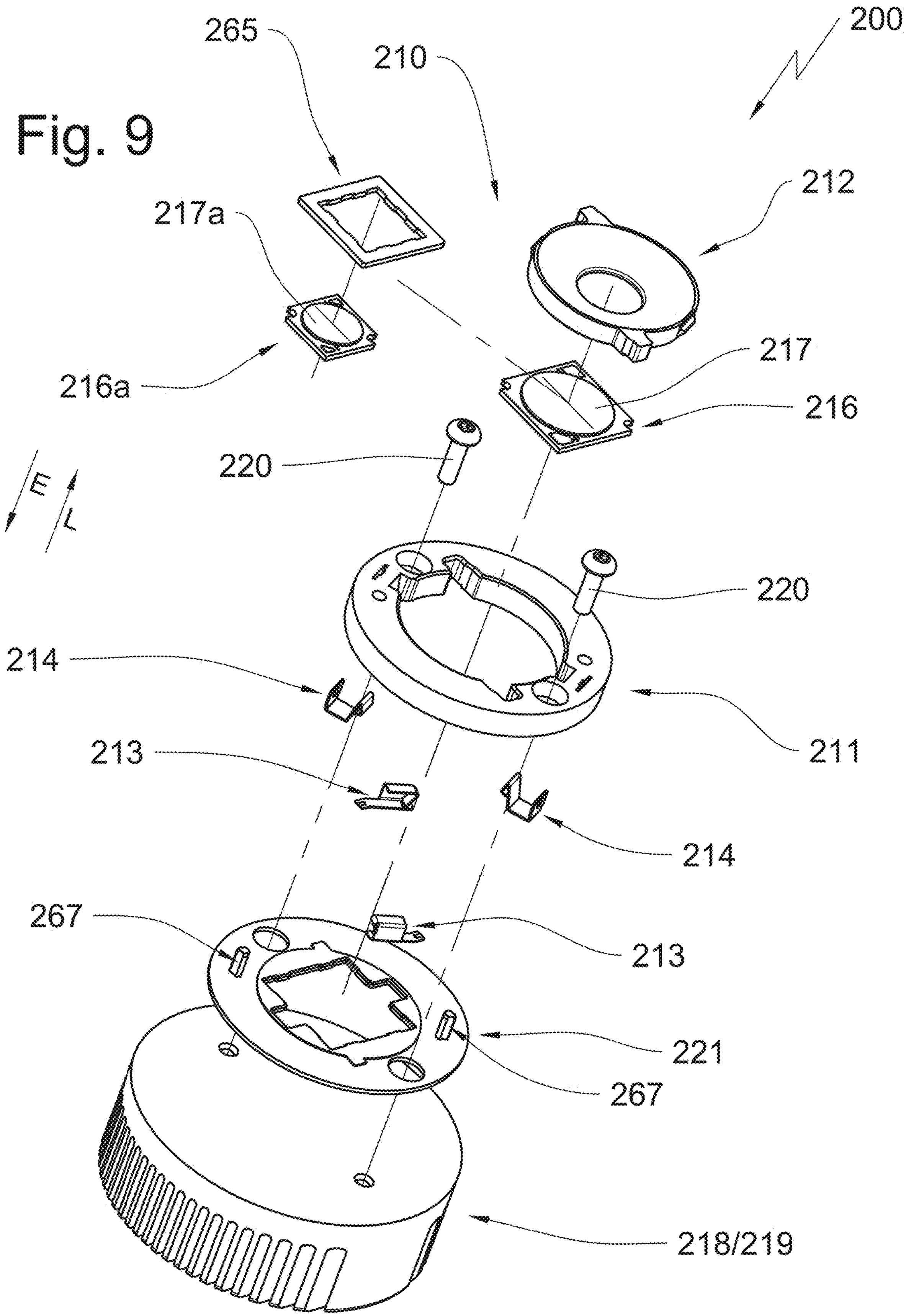
FIG. 9: a perspective view of a second embodiment of the invention in an exploded representation.

FIG. 9 shows an exploded representation of the second embodiment 200. The second embodiment 200 likewise comprises a connection element 210, which comprises a first ring/outer ring 211 and a second ring/inner ring 212. Furthermore, connection contacts 213 and tension elements 214 are a part of the connection element 210 of the second embodiment 200. The first ring 211 also has a bottom plate 221, which in this exemplary embodiment, however, not only forms the inner contour 123, but also has additional functions. This will be discussed later.

The connection element of the second embodiment 200, which is provided with the reference numeral 210 in its entirety, also serves to arrange a circuit board 216 with an LED 217 arranged thereon on a counter bearing 218, in particular a heat sink 219. Also, in this embodiment 200, the connection element 210 is fixed to the heat sink 219 by means of screw bolts 220. In addition, the exploded representation according to FIG. 9 shows an alternative LED circuit board 216*a* with an alternative LED 217*a*. In order to mount this in the connection element 210, an adapter frame 265 is provided.

Figure 10A:
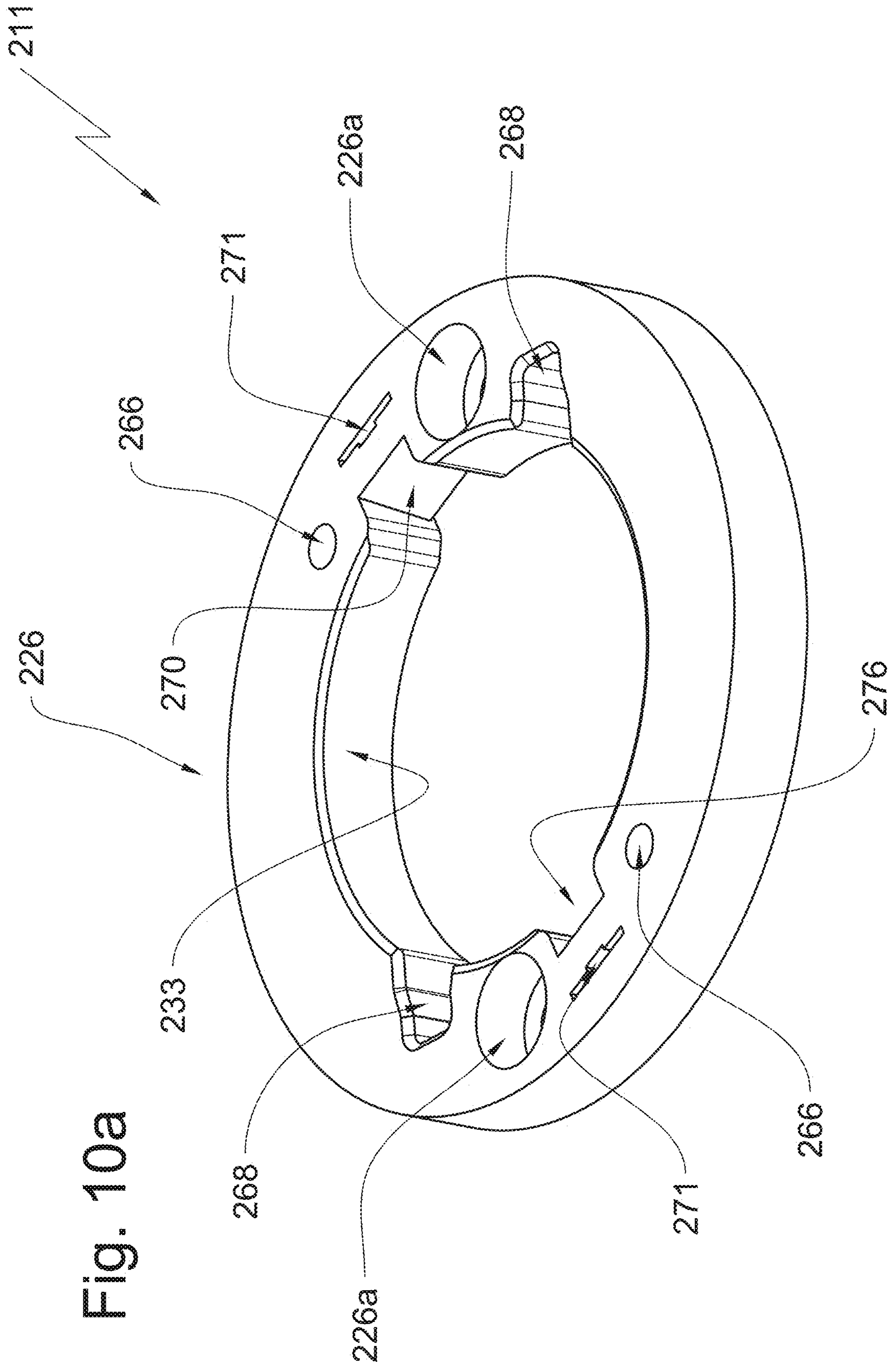
FIG. 10*a*: the first ring/inner ring of the second embodiment according to FIG. 9 in a perspective view from above.

FIG. 10*a* shows the outer ring 211 or first ring 211 in a perspective view of its upper side O. The bottom plate 221 of the outer ring 211 is not shown.

The ring collar 226 of the outer ring 211 is similarly provided with receiving holes 226*a*, though which the screw bolts 220 (not shown) engage in order to fix the outer ring 211 on the heat sink 219. Retaining channels 266 formed by the ring collar 226 interact with choke pins 267 (see, for example, FIG. 9), which are arranged on the bottom plate 221 and extend in the light emission direction L.

The ring collar 226 then forms positioning grooves 268 located diametrically opposite each other. These are formed as recesses in the direction of the outer circumference in the otherwise substantially circular inner circumferential wall section 233 of the ring collar 226. The positioning grooves 268 are open towards the upper side O of the ring collar 226, so that they are able to receive components in the opposite direction to the light emission direction L.

For the arrangement of the tension elements 214, which in the second exemplary embodiment are each formed as latching springs 269, the ring collar 226 is provided at diametrically opposite points with receiving grooves 270 open towards the upper side. These also form sunk recesses of the inner circumferential wall section 233 in the direction of the outer circumference. The fixing slots 271 are arranged downstream of the receiving grooves 270 in the direction of the outer circumference.

Figure 10B:
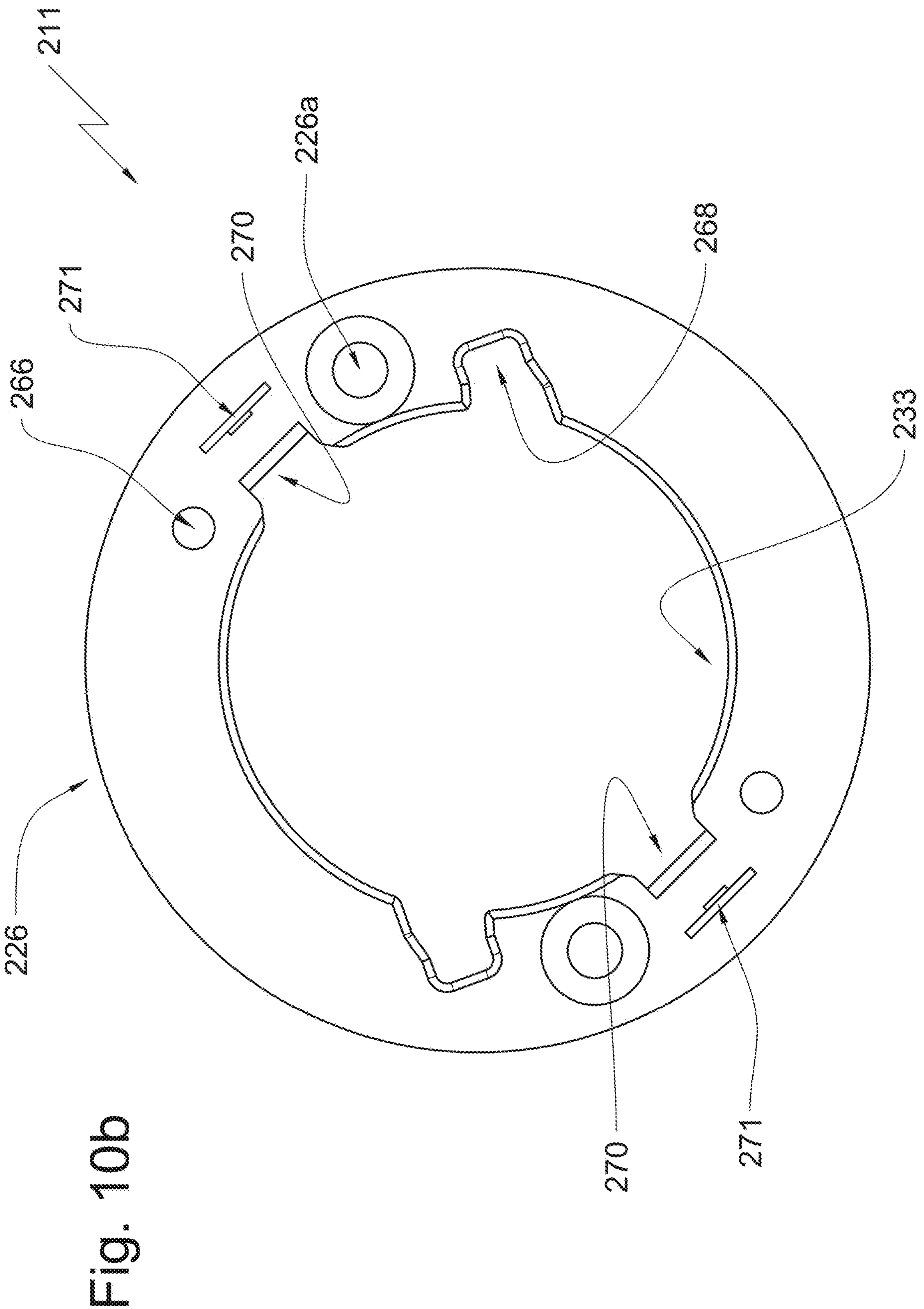
FIG. 10*b*: the representation according to FIG. 10*c* in a view from above.

FIG. 10*b* shows the outer ring 211 according to FIG. 10*a*, again in a view from above. In particular, it can be seen from this representation that the inner circumferential wall sections 233 of the ring collar 226 are also substantially circular here.

Figure 10C:
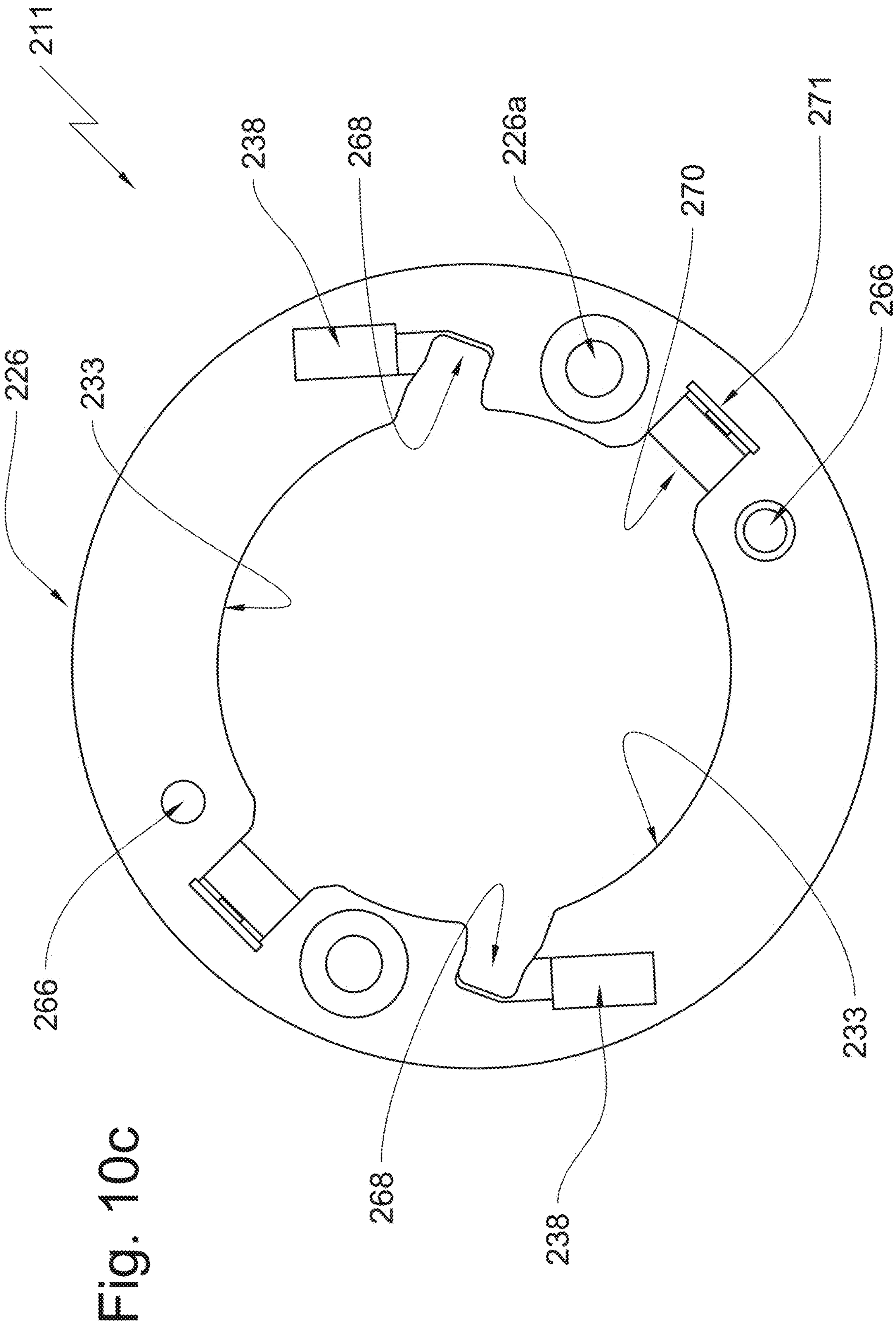
FIG. 10*c*: the first ring/inner ring of the second embodiment in a view from below without contacts and without tension elements.

FIG. 10*c* shows the outer ring 211 in a view from below. In particular, it can be seen from this representation that the outer ring 211 also forms connection chambers 238 on its underside. The connection chambers 238 are—as the bottom plate 221 is not installed—open downwards, i.e. open in the direction of the heat sink 219. In this manner, a connection contact 213 can be inserted into each connection chamber 238 when the bottom plate 221 is not installed. In the shown exemplary embodiment 200, the connection chambers 238 are arranged adjacent to the positioning grooves 268 and are open towards the respective adjacent positioning groove 268.

FIG. 10*c* also shows that the fixing slots 271 pass downwards through the ring collar 226.

Figure 11A:
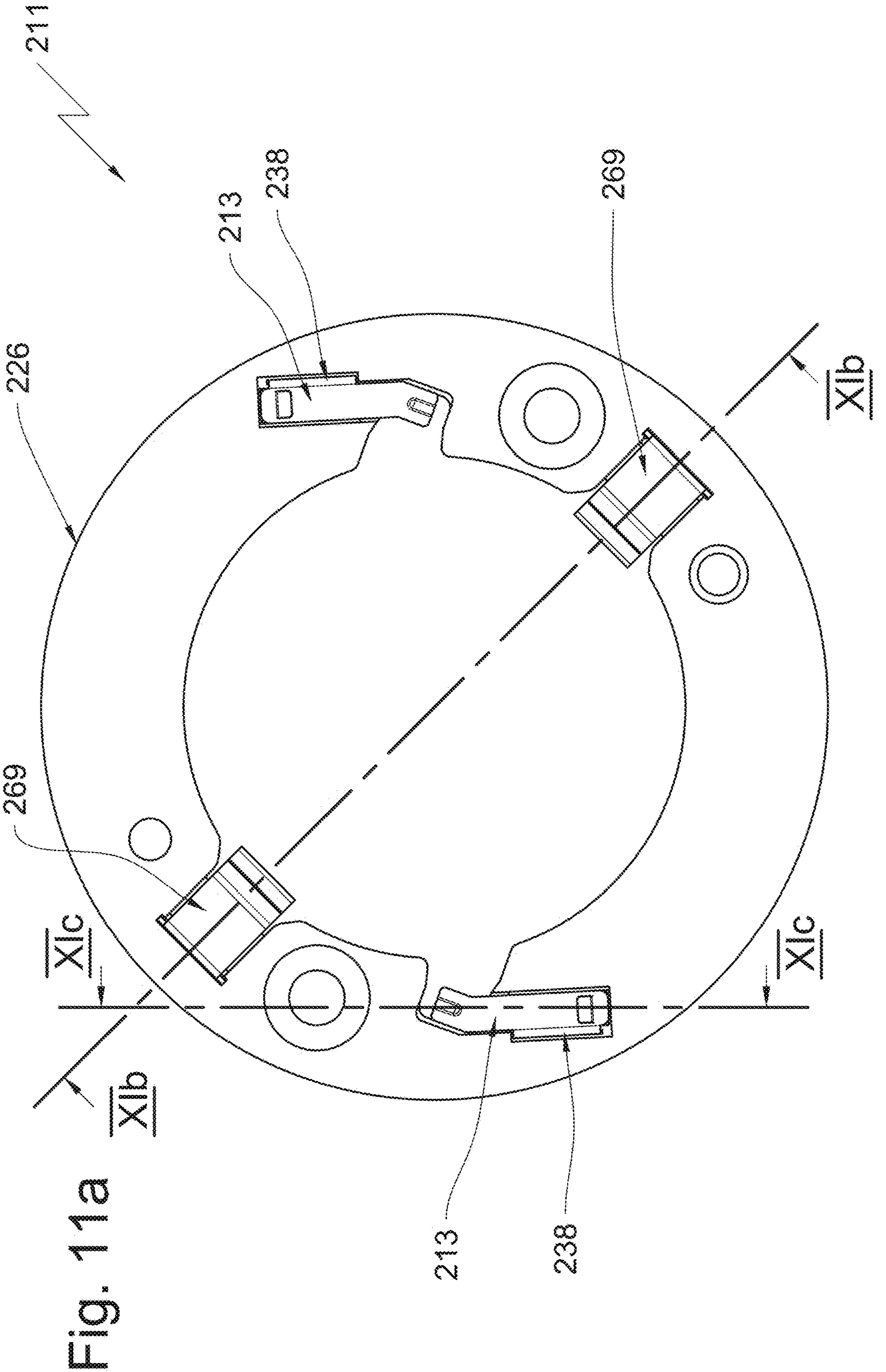
FIG. 11*a*: the representation according to FIG. 10*c* with contacts and with tension elements.

FIG. 11*a* shows the representation according to FIG. 10*c*, but here the connection contacts 213 are seated in the connection chambers 238 and the latching springs 269 are inserted in a respective receiving groove 270.

Figure 11B:
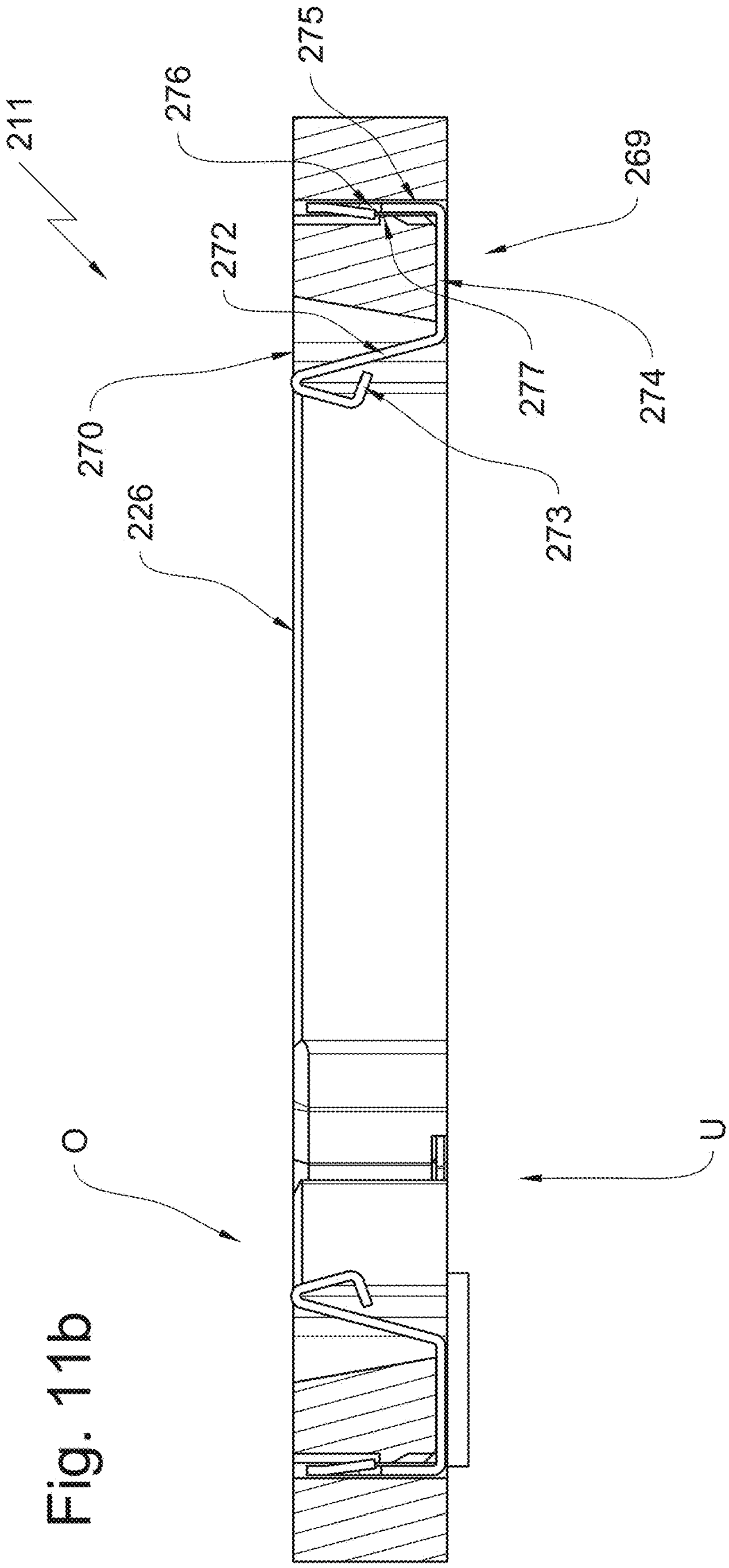
FIG. 11*b*: a sectional view of the first ring/outer ring according to section line XI B-XI B in FIG. 11*a;*

FIG. 11*b* is a sectional view through the outer ring 211 according to section line XI B-XI B in FIG. 11*a*. It can be recognised from this illustration that the latching springs 269 initially form a spring arm 272 with latching cams 273. The spring arm 272 is connected to a retaining leg 275 via an intermediate piece 274. Overall, the latching spring 269 has an approximately U-shaped cross-section.

The latching spring 269 is inserted with its retaining leg 275 into the fixing slot 271, wherein the spring arm 272 comes to rest with the latching cam 273 in the receiving groove 270. In the exemplary embodiment, the retaining leg 275 has a notch 276 which engages behind a projection 277 located in the fixing slot 271 in order to ensure that the latching spring 269 is secured in the outer ring 211 with a positive fit. Such a positive fit is not required. A frictional fit would also be conceivable.

Figure 11C:
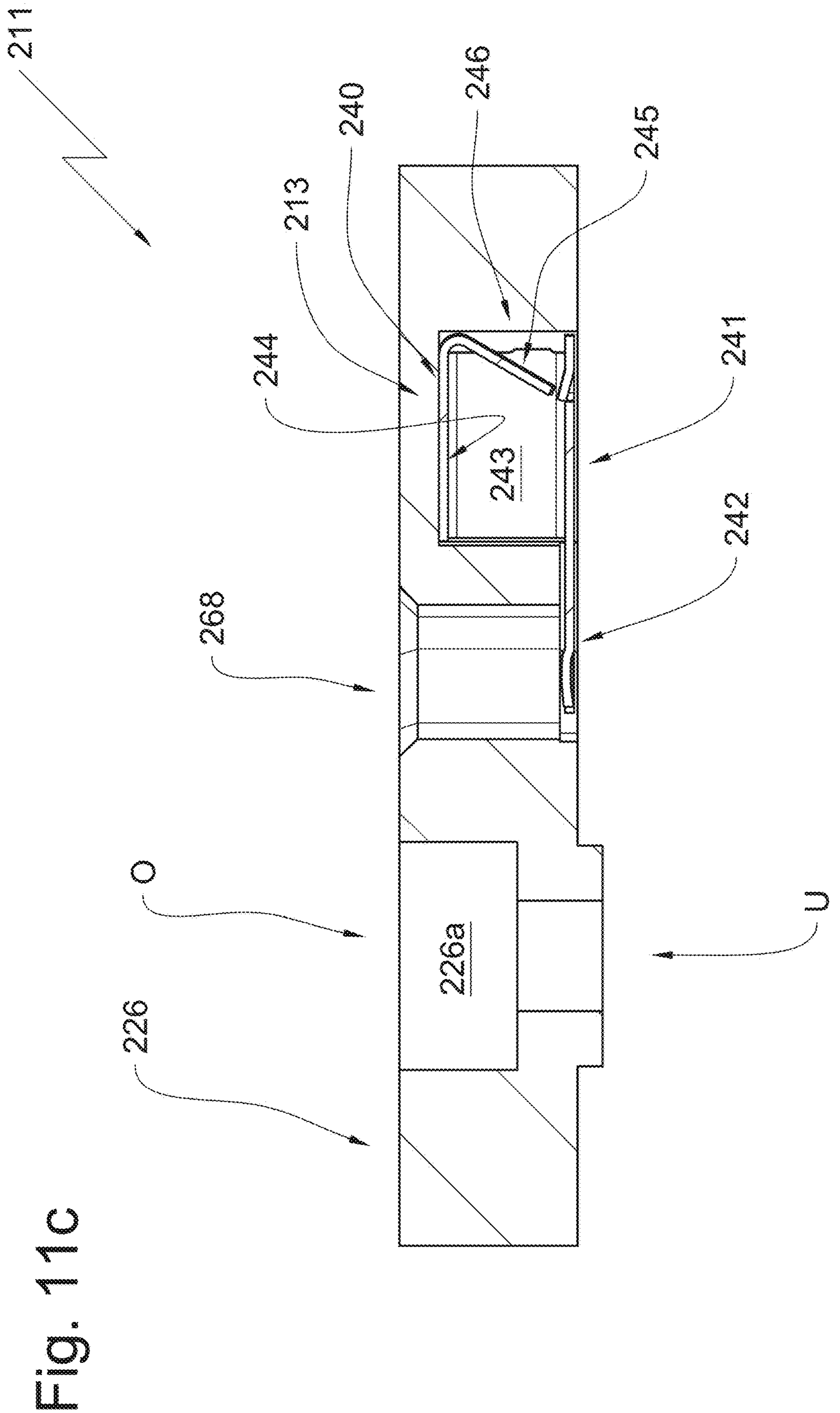
FIG. 11*c*: a sectional view of the first ring/outer ring according to section line XI C-XI C in FIG. 11*a;*

FIG. 11*c* shows a sectional view through the outer ring 211 according to section line XI C-XI C in FIG. 11*a*. The section line is placed here in particular through the connection contact 213 in order to explain the construction of the connection contact 213.

The connection contact 213 is basically almost identical to the connection contact 113 of the first embodiment 100. Here as well, the connection contact 213 is initially formed by a contact cage 240, which forms a contact bar 241 on its underside. The contact bar 241 is connected to a contact cover 244 via a contact side wall 243 extending upwards. The contact cover 244 carries a clamping leg 245 which projects into the contact input 246 and forms a clamping point for connection of a connection lead to be inserted. The contact input 246 can be reached by a connection channel 247 (not shown). On its side facing away from the clamping leg 245, the contact bar 241 carries a contact extension 242 which extends into the positioning groove 268.

Figure 12A:
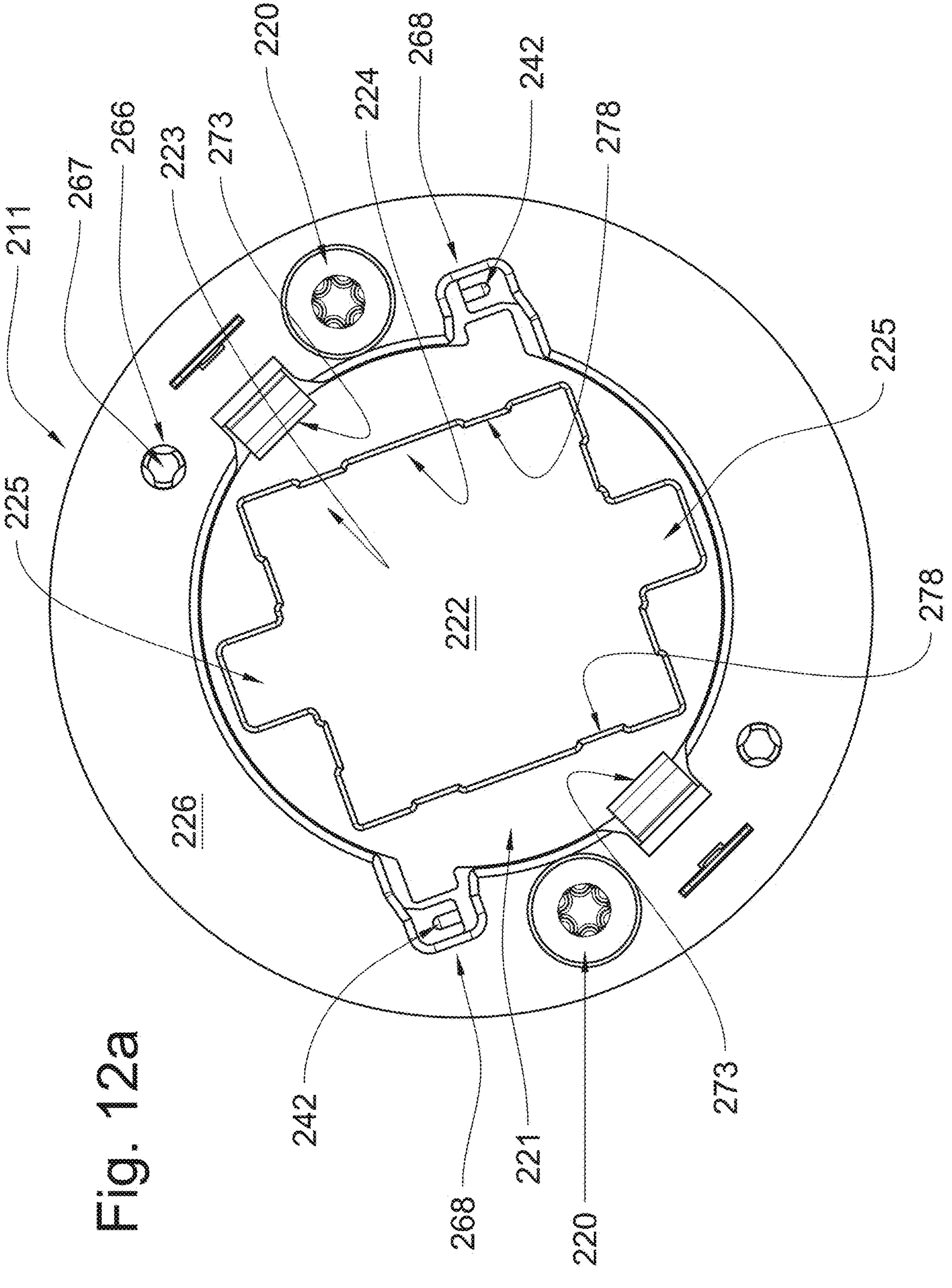
FIG. 12*a*: a view of the installed first ring/outer ring of a second embodiment in a view from above.

FIG. 12*a* now shows a view from above of the assembled and installed outer ring 211, wherein the heat sink 219 has been omitted for an improved clarity. The screw bolts 220 hold the outer ring 211 on the heat sink 219 (not shown). The bottom plate 221 is set onto the outer ring 211 from below, wherein the choke pins 267 penetrate into the retaining channel 266 and are anchored there by a friction fit.

The bottom plate 221 has an aperture 222, the inner contour 223 of which forms a rectangular, substantially square insert contour 224. The insert contour 224 is interrupted by two opposing engagement contours 225, wherein here also the insert contour 224 holds the circuit board 216 (not shown here) parallel to its mounting surface on the heat sink 219 and the engagement contours 225 serve to enable the circuit board 216 to be removed from the outer ring 211 without tools or by means of a suitable tool. It is worth mentioning that in this exemplary embodiment 200, the insert contour 224 is provided with clamping cams 278. These project into the aperture 222.

FIG. 12*a* also shows that the latching cams 273 of the latching spring 269 project into the ring space of the outer ring 211 and that the contact extensions 242 sit in the positioning grooves 268.

Figure 12B:
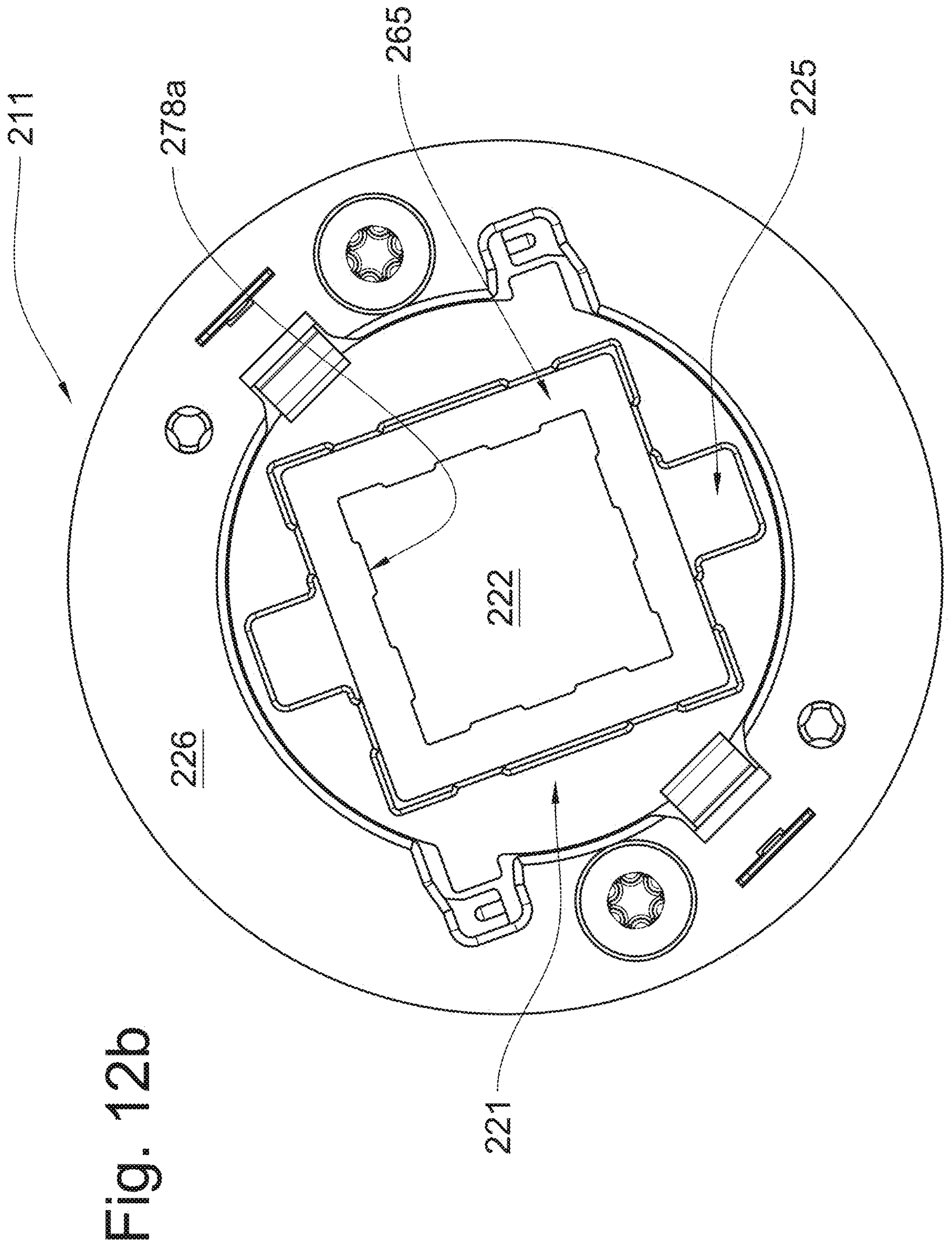
FIG. 12*b*: the representation according to FIG. 12*a* with the inserted adapter frame.

FIG. 12*b* is a view from above of the installed outer ring 211 and shows the same situation as FIG. 12*a*. The adapter frame 265 is inserted in the aperture 222 of the bottom plate 221 and assumes the shape of the insert contour 224 of the bottom plate 221 but reduced in size: The adapter frame 265 also carries clamping cams 278*a* which function analogous to the clamping cams 278 of the bottom plate 221.

Figure 13A:
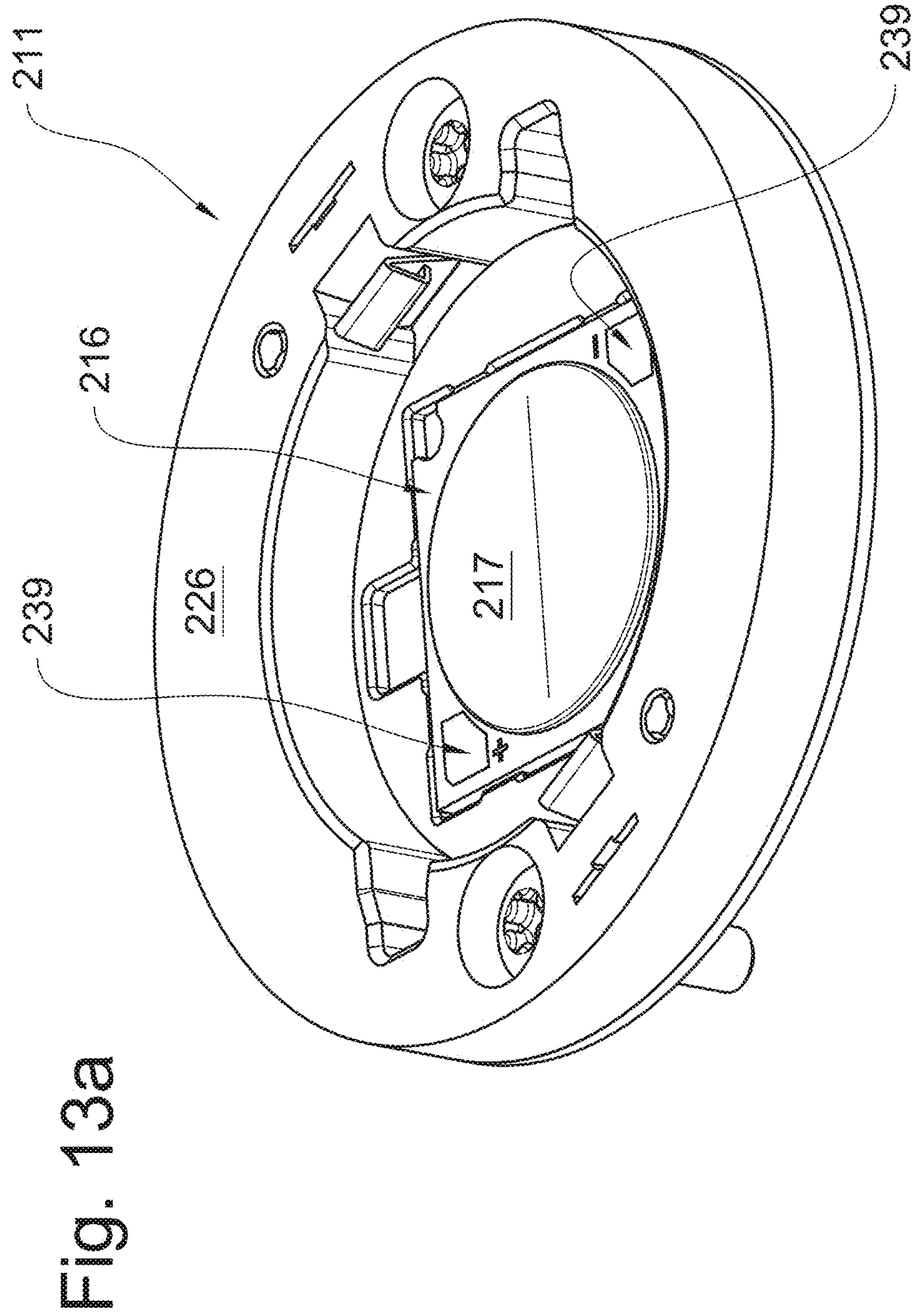
FIG. 13*a*: a representation of the second embodiment with the inserted LED circuit board, without the heat sink and without the inner ring.
Figure 13B:
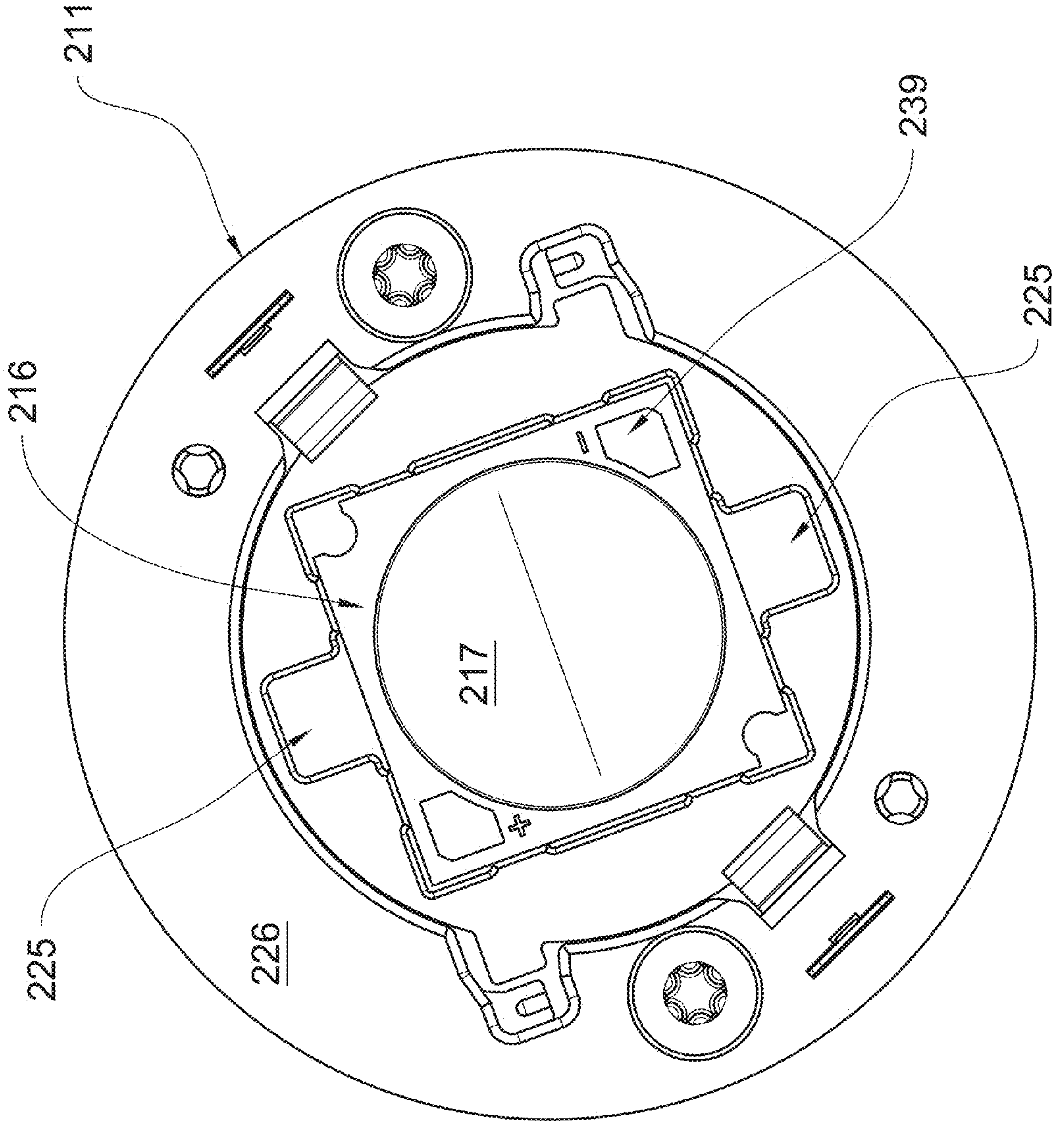
FIG. 13*b*: the representation according to FIG. 13*a* in a view from above.

FIG. 13*a* shows the installed outer ring 211 in a perspective view from above. FIG. 13*b* shows a view from above of the outer ring 211 shown in FIG. 13*a*. FIGS. 13*a* and 13*b* substantially show the situation described in FIG. 12*a*. However, an LED circuit board 216 is inserted in both figures which carries an LED 217. Contact pads 239 are arranged on the LED circuit board 216. The LED 217 is supplied with electricity via these, which is provided via the connection contacts 213 and conducted to the LED 217 via supply contacts (not shown).

It can be seen in both figures that the clamping cams 278 hold the LED circuit board 216 in the insert contour 224 without play and with a frictional fit, wherein it can also be seen here that the LED circuit board 216 can be released from the bottom plate 221 via the engagement contour 225.

Figure 13C:
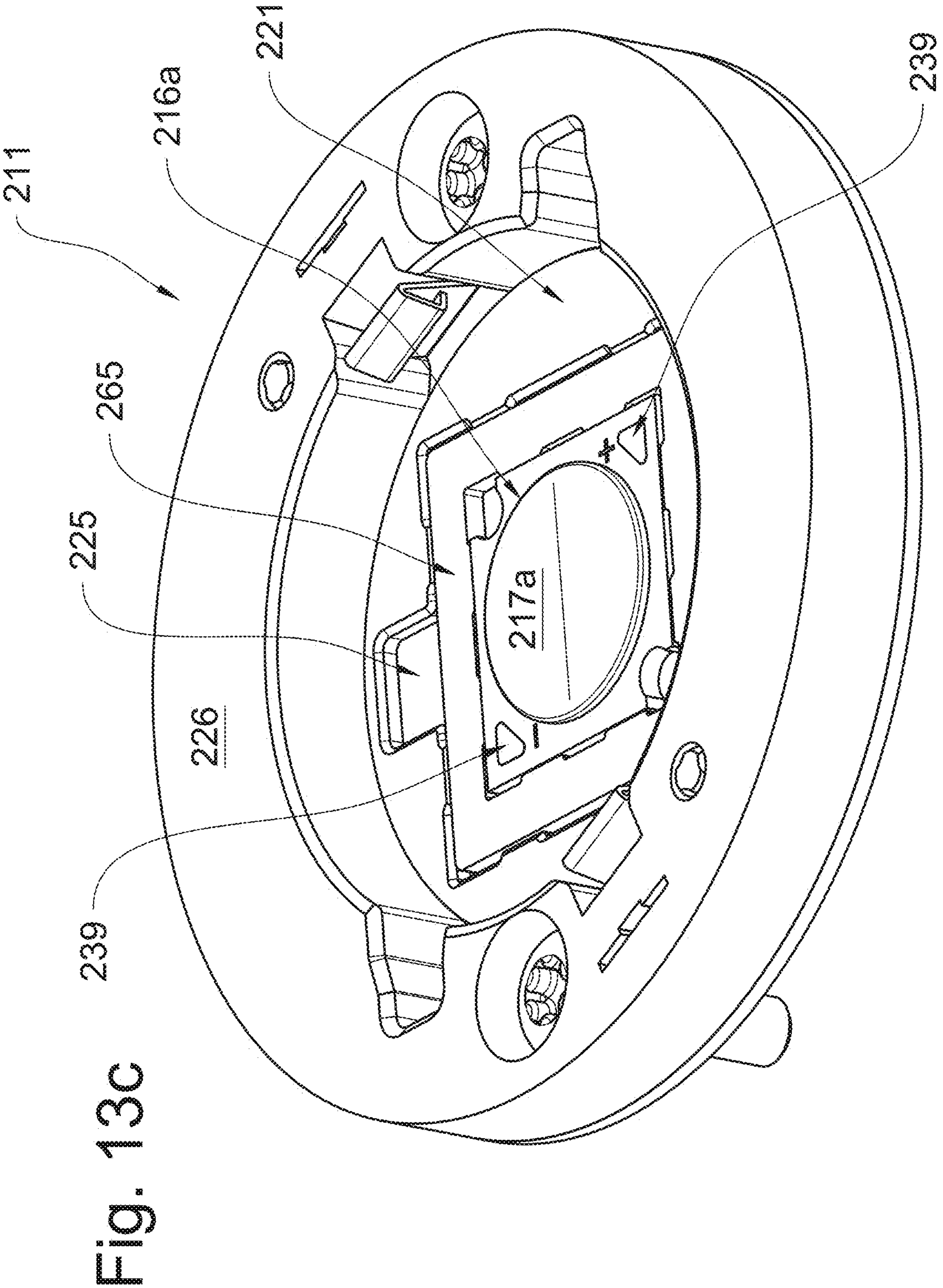
FIG. 13*c*: an alternative representation of the second embodiment with the inserted LED circuit board and adapter frame, without the heat sink and without the inner ring.
Figure 13D:
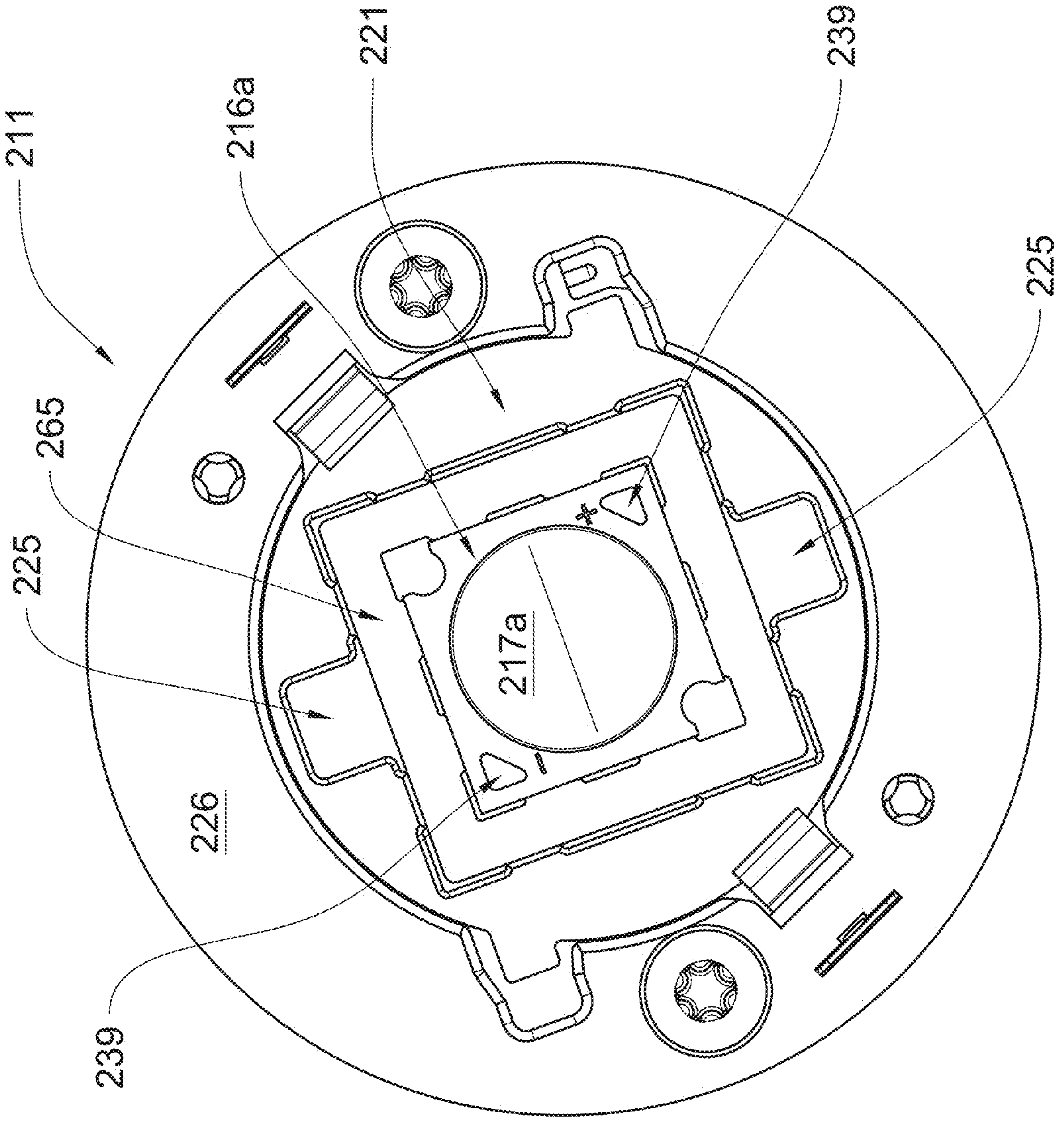
FIG. 13*d*: the representation according to FIG. 13*c* in a view from above.

In FIGS. 13*c* and 13*d*, the adapter frame 265 is inserted into the insert contour 224 of the bottom plate 221. The adapter frame 265 again holds the alternative circuit board 216*a* which is clearly substantially smaller than the circuit board 216 in FIGS. 13*a* and 13*b*. A comparison of FIGS. 13*c* and 13*d* with FIGS. 13*a* and 13*b* clearly shows that the alternative circuit board 216*a* is also held in the same way as the circuit board 216, namely frictionally engaged by clamping cams of the adapter frame 265.

Here it is to be noted, as already explained above, that the adapter frames 265 or the principle of the adaptation of circuit boards 216, 216*a* of different sizes can also be used easily in the first embodiment 100. In the same manner, it should be noted for the second embodiment 200 described here that the bottom plate 221 does not necessarily have to be adapted to a circuit board 216. The bottom plate 221 of the second embodiment 200 can form a receiving contour for adapter frames 265, wherein then only the adapter frames 265 corresponds to one or more LED circuit boards 216, 216*a*.

The rectangular, in particular square, insert contour is also due to the LED circuit boards 216, 216*a* and 116 shown as examples in the first exemplary embodiment 100. Other circuit boards 216, 216*a* or 116 may require different insert contours 224, 124. These can easily be realised via the bottom plate 221, 121 or suitable adapter frames 265.

Figure 14A:
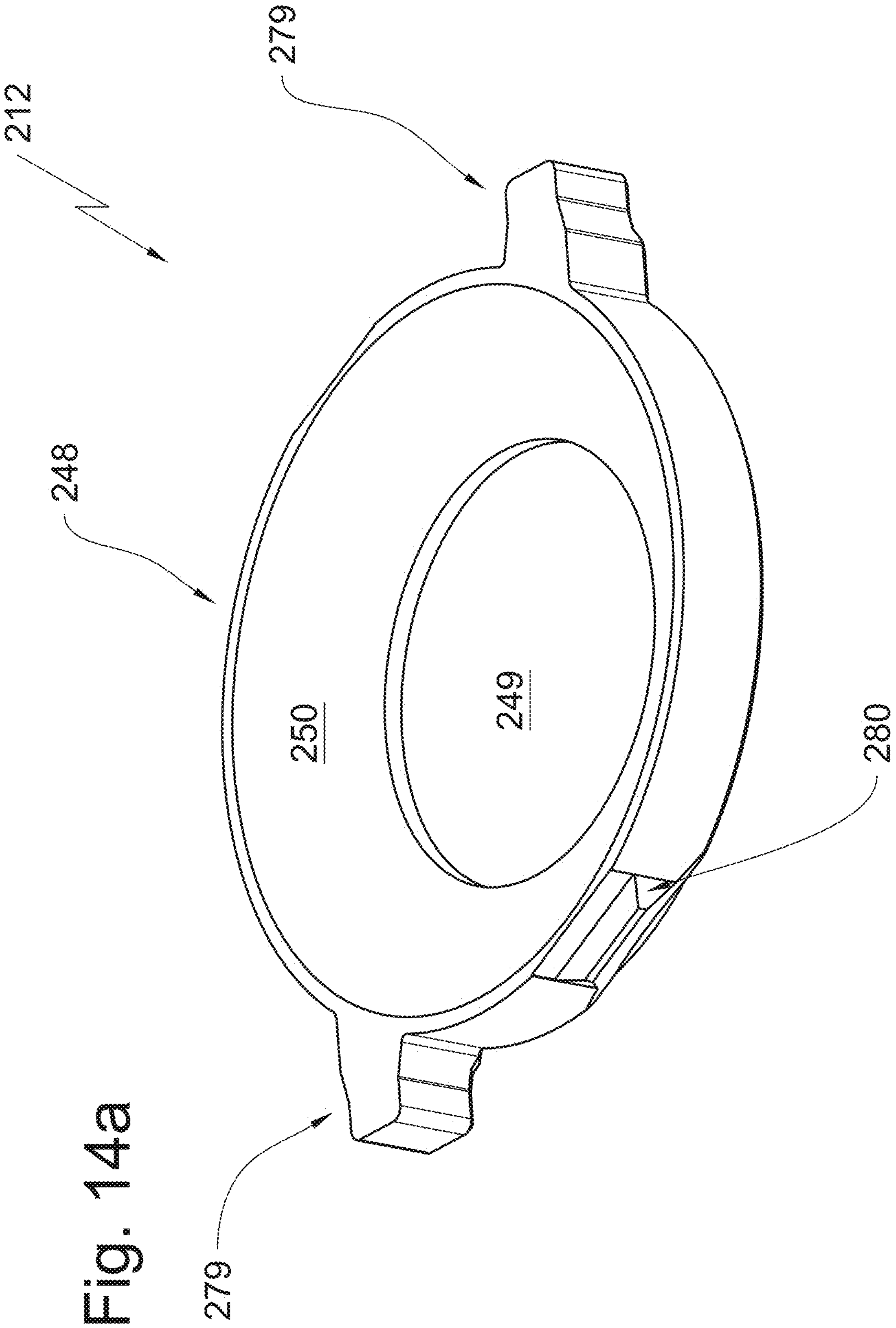
FIG. 14*a*: the second ring/inner ring of the second embodiment according to FIG. 9 in a perspective view from above.

FIG. 14*a* shows the inner ring 212 or second ring 212 of the second embodiment 200. The inner ring 212 comprises a ring wall 248 having a central LED recess 249. A preferred circumferential ring wall section 250 slopes downwards from the upper side O of the inner ring 212 to the underside U and has a funnel-shaped design in the direction of the centre of the inner ring 212. In this manner, the ring wall 248 does not shade the light emitted by the LED 217.

The ring wall 248 carries two positioning pins 279 placed diametrically opposite each other, on its outer circumference. These protrude outwards, i.e. from the centre point M, and serve to correctly orientate the inner ring 212 in the outer ring 211.

In the second embodiment 200, the inner ring 212 has latching projections 280, placed diametrically opposite each other and arranged on the outer circumference of the ring wall 248. These combine the function of the tension element and the locking element in one component.

Figure 14B:
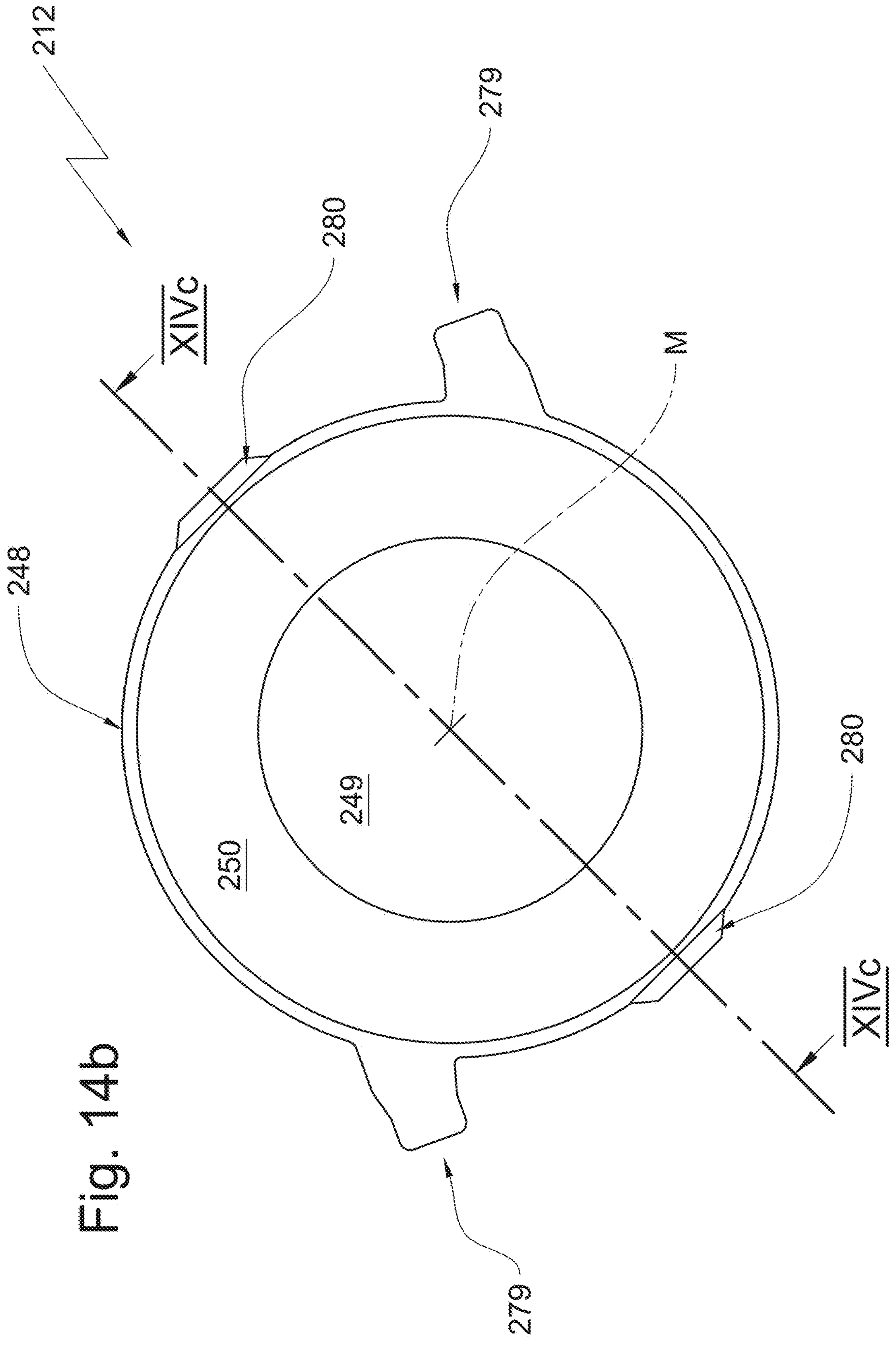
FIG. 14*b*: the representation according to FIG. 14*a* in a view from above.

FIG. 14*b* shows the representation according to FIG. 14*a* in a view from above. Using this figure, it can be seen very well that both the latching projections 280 and the positioning pins 279 protrude outwards from the ring wall 248.

Figure 14C:
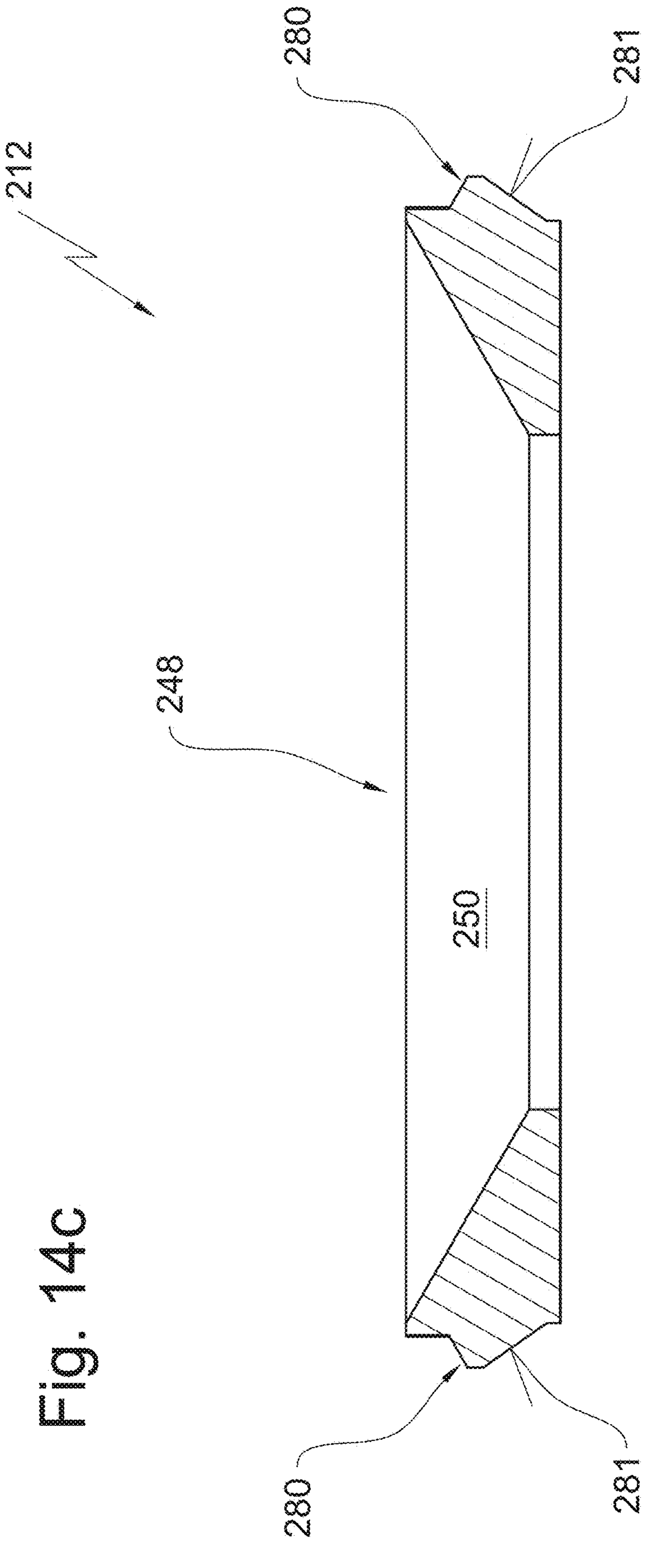
FIG. 14*c*: a sectional view through the second ring/inner ring according to section line XIV C-XIV C in FIG. 14*b;*

FIG. 14*c* is a sectional representation along the section line XIV C-XIV C through the inner ring 212. This figure shows in particular the latching projections 280, which are provided with gliding surfaces 281, facing towards the underside U, and extending obliquely upwards and outwards, and locking surfaces 282 extending in the opposite direction.

Figure 15A:
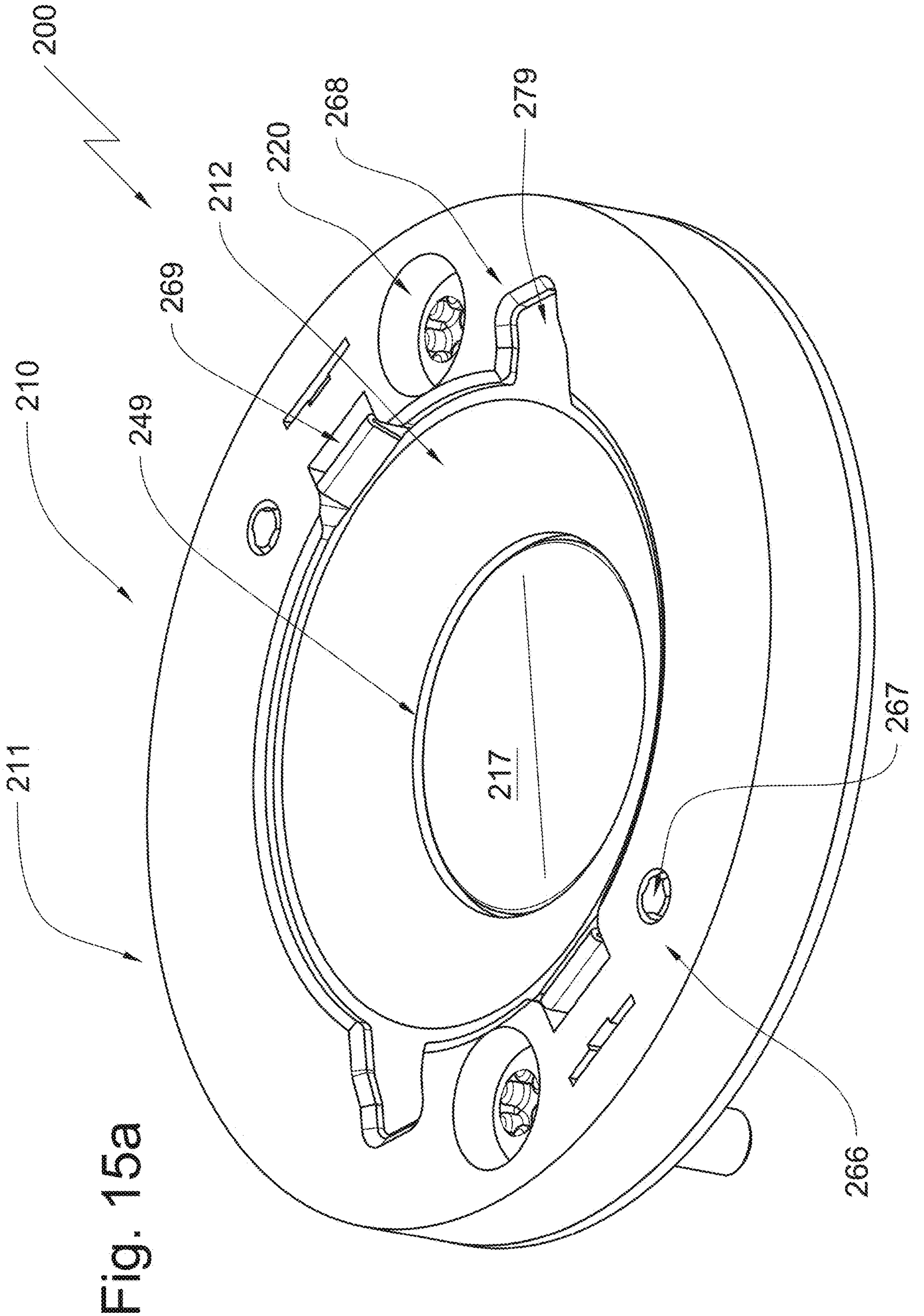
FIG. 15*a* the second embodiment according to FIG. 9 in an assembled state without the heat sink in a perspective view of the upper side.

FIG. 15*a* shows the second embodiment 200 in installed form, wherein however the heat sink 219 is not shown for clarity purposes. The inner ring 212 is inserted into the outer ring 211. The LED 217 sits in the LED recess 249 of the second ring 212. The positioning pins 279 of the inner ring 212 are seated in the positioning grooves 268 and thus ensure the correct arrangement of the inner ring 212 in the outer ring 211. In the exemplary embodiment 200, it is particularly important that the latching projections 280 of the inner ring 212 are aligned with the latching springs 269 of the outer ring 211.

Figure 15B:
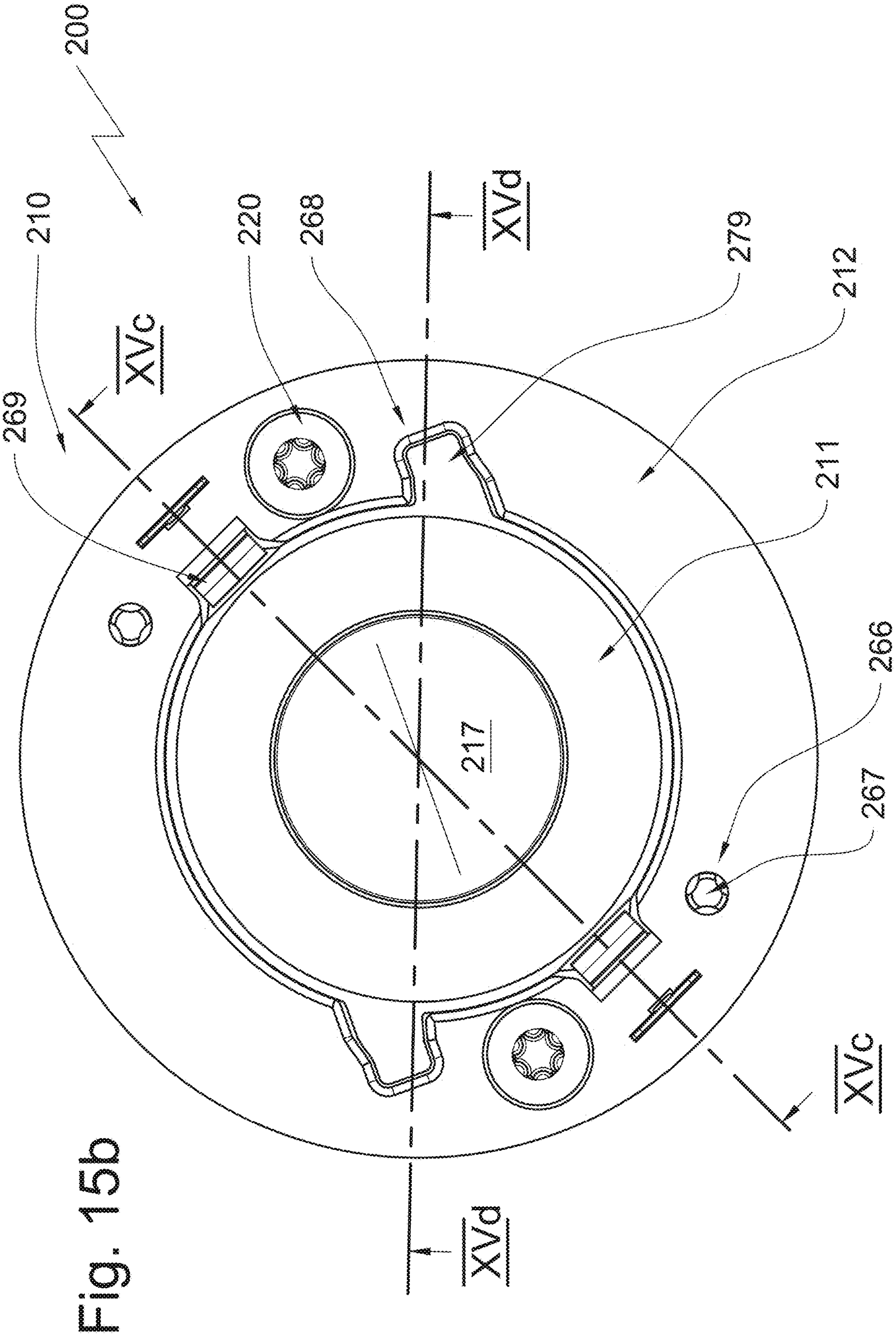
FIG. 15*b*: the representation according to FIG. 15*a* in a view from above.

FIG. 15*b* shows the representation according to FIG. 15*a* in a view from above. The explanations given for FIG. 15*a* therefore also apply to FIG. 15*b*.

Figure 15C:
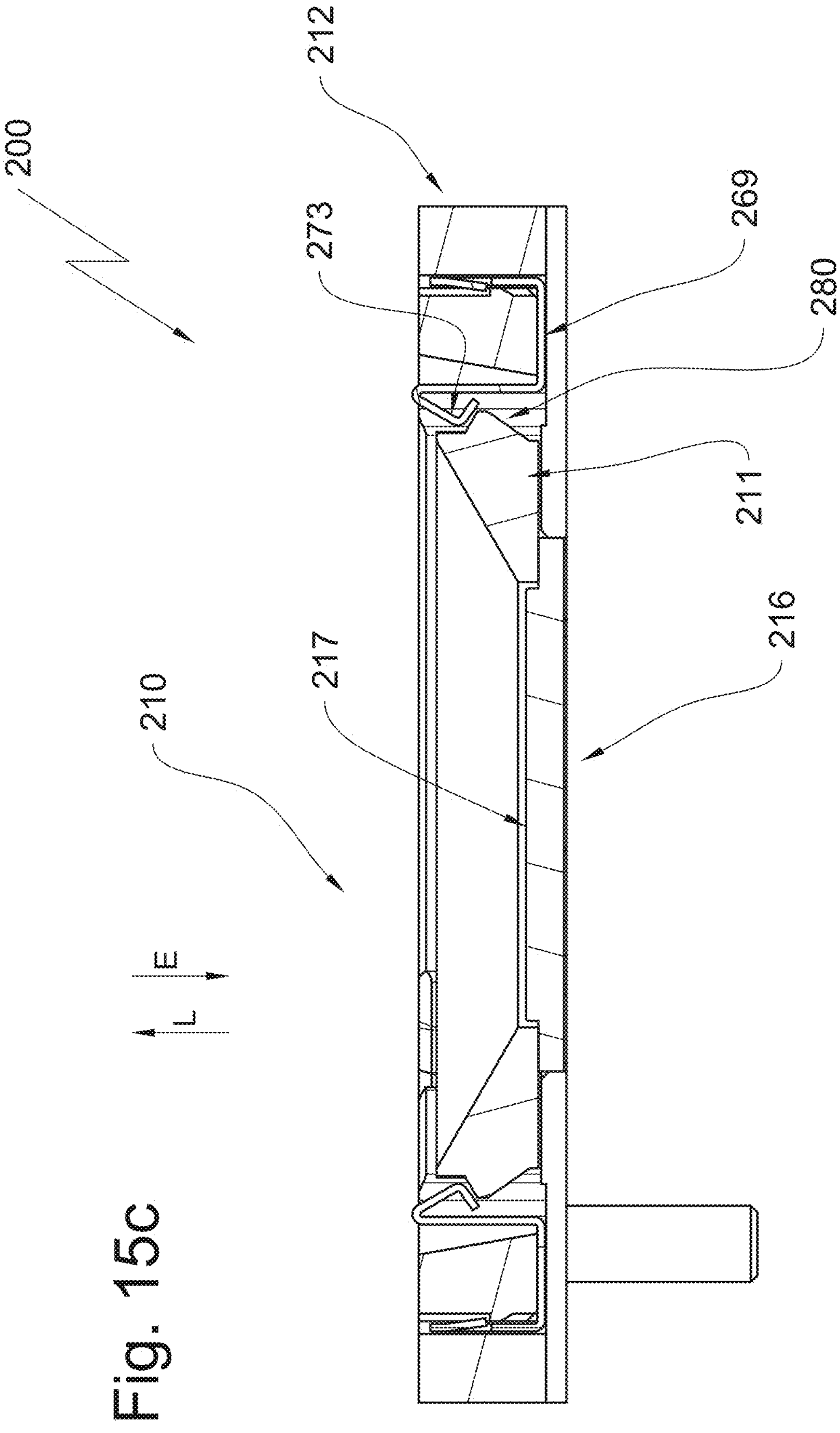
FIG. 15*c*: a sectional representation according to section line XV C-XV C in FIG. 15*b*.

FIG. 15*c* is a sectional view of the second embodiment 200 according to section line XV C-XV C in FIG. 15*b*. Based on this figure, the mechanical fixing of the inner ring 212 in the outer ring 211 can be explained as follows:

The inner ring 212 is inserted into the outer ring 211 in the insertion direction E, i.e. counter to the light emission direction L, consequently in the direction of the LED circuit board 216 or in the direction of the heat sink 219, which is not shown. Here, the latching projections 280 displace the latching cams 273 of the latching springs 269, which protrude into the ring space of the outer ring 211 in their rest position. The latching cams 273 perform an overstroke movement over the latching projection 280 caused by the return elasticity of the latching springs 269. In the end position of the inner ring 212 in the outer ring 211, the latching cams 273 engage behind the latching projections

280 and thus prevent a release movement of the inner ring 212 in the light emission direction L, i.e. in the vertical direction.

The pair of inclined surfaces between the latching cams 273 and the respectively associated latching projection 280 also transmit a tension force acting in the insertion direction E from the latching springs 269 to the inner ring 212. In this manner, the latching springs 269 serve as tension elements and the latching projections 280 as tension receiving elements in order to tension the inner ring 212 against the circuit board 216 and press it against the heat sink 219, which is not shown in FIG. 15*c*. In this manner, optimum heat transfer from the LED circuit board 216 to the heat sink 219 can be ensured.

It should also be noted that in embodiments 100 and 200 of the present description, circular ring-shaped or substantially circular ring-shaped outer rings 111 and 211 and inner rings 112 and 212 are shown. However, the circular shape is not necessarily required for the success of the connection element. This also applies to the first exemplary embodiment 100, in which the inner ring 112 is rotated in the outer ring 111.

Screw bolts 120 or 220 are also used to fix the connection element 110 or 210 in embodiments 100 and 200. Of course, it is conceivable to use other fasteners for fastening the respective connection element 110 or 210.

| LIST OF REFERENCE SIGNS | |
|---|---|
| 100 | first embodiment |
| 110 | connection element |
| 111 | first ring/outer ring |
| 112 | second ring/inner ring |
| 113 | connection contacts |
| 114 | tension element |
| 115 | tension spring |
| 116 | circuit board |
| 117 | LED |
| 118 | counter bearing |
| 119 | heat sink |
| 120 | screw bolts |
| 121 | bottom plate |
| 122 | aperture |
| 123 | inner contour |
| 124 | insert contour |
| 125 | engagement contour |
| 126 | ring collar |
| 126a | receiving holes |
| 127 | retaining section |
| 128 | passage channel |
| 129 | tension spring arm |
| 130 | support pin |
| 131 | wall hook receptacle |
| 132 | centring surface |
| 133 | inner wall section |
| 134 | abutment recess |
| 135 | end abutment surface |
| 136 | receptacle for pins |
| 137 | tension pins |
| 138 | connection chamber |
| 139 | contact pad |
| 140 | contact cage |
| 141 | contact bar |
| 142 | contact extension |
| 143 | contact side wall |
| 144 | contact cover |
| 145 | clamping leg |
| 146 | contact input |
| 147 | connection channel |
| 148 | ring wall |
| 149 | LED recess |
| 150 | ring wall section |
| 151 | actuating handle |
| 152 | abutment element |

-continued

| LIST OF REFERENCE SIGNS | |
|---|---|
| 153 | abutment surface |
| 154 | tension receiving element |
| 155 | locking element |
| 156 | locking web |
| 157 | collar projection |
| 158 | anchor lug |
| 159 | inclined run-on surface |
| 160 | support surface |
| 161 | bearing surface |
| 162 | anchor projection |
| 163 | centring web |
| 164 | locking chamber |
| R | locking direction |
| E | insertion direction |
| L | light emission direction |
| M | centre point |
| U | underside |
| O | upper side |
| X | lead plug-in direction |
| 200 | second embodiment |
| 210 | connection element |
| 211 | first ring/outer ring |
| 212 | second ring/inner ring |
| 213 | connection contact |
| 214 | tension element |
| 216 | circuit board |
| 216a | alternative circuit board |
| 217 | LED |
| 217a | alternative LED |
| 218 | counter bearing |
| 219 | heat sink |
| 220 | screw bolts |
| 221 | bottom plate |
| 222 | aperture |
| 223 | inner contour |
| 224 | insert contour |
| 225 | engagement contour |
| 226 | ring collar |
| 226a | receiving hole |
| 233 | inner circumference wall section |
| 238 | connection chamber |
| 239 | contact pad |
| 240 | contact cage |
| 241 | contact bar |
| 242 | contact extension |
| 243 | contact side wall |
| 244 | contact cover |
| 245 | clamping leg |
| 246 | contact input |
| 247 | connection channel |
| 248 | ring wall |
| 249 | LED recess |
| 250 | ring wall section |
| 265 | adapter frame |
| 266 | retaining channel |
| 267 | choke pin |
| 268 | positioning groove |
| 269 | latching spring |
| 270 | receiving groove |
| 271 | fixing slot |
| 272 | spring arm |
| 273 | latching cams |
| 274 | intermediate piece |
| 275 | retaining leg |
| 276 | notch |
| 277 | projection |
| 278 | clamping cam |
| 278a | clamping cam |
| 279 | positioning pin |
| 280 | latching projection |
| 281 | sliding surface |
| 282 | locking surface |

What is claimed is:

1. A connection element (110, 210) for electrical connection of an LED light module, the LED light module having a circuit board (116, 216) with contact pads (139, 239) for supplying electricity to an LED (117, 217), the connection element (110, 210) comprising:

a substantially ring-shaped frame configured to overlap the circuit board (116, 216) and to mechanically hold the circuit board (116, 216) on a mounting surface of a counter bearing (118, 218); and a contact arrangement which is mounted in the substantially ring-shaped frame and serves to supply electricity to the LED (117, 217), wherein the substantially ring-shaped frame is divided into a first ring (111, 211) and a second ring (112, 212), wherein the first ring (111, 211) is configured to surround the circuit board (116, 216) and to hold the circuit board (116, 216) in a parallel direction with respect to the mounting surface of the counter bearing (118, 218), wherein the second ring (112, 212) at least partially overlaps the circuit board (116, 216) and is configured to hold the circuit board (116, 216) in a vertical direction with respect to the mounting surface of the counter bearing (118, 218), wherein the contact arrangement comprises a connection contact (113, 213) configured as a clamping contact for connecting a stripped connection lead, the connection contact (113, 213) being arranged in the first ring (111, 211), and a supply contact arranged in the second ring (112, 212), configured to connect the connection contact (113, 213) to the contact pads (139, 239), wherein the connection contact (113, 213) and the supply contact are separate components that enter into an electrical connection with each other when the first ring (111, 211) and the second ring (112, 212) are combined in an assembled state to form the substantially ring-shaped frame.

2. The connection element (110, 210) according to claim 1, wherein the first ring (111, 211) has a retaining part, wherein the second ring (112, 212) has a coupling part, and wherein the retaining part and the coupling part interact with each other to fix the second ring (112, 212) to the first ring (111, 211).

3. The connection element (110, 210) according to claim 1, wherein the first ring (111, 211) or the second ring (112, 212) is configured to be attached with fasteners to the counter bearing (118, 218) to mechanically anchor the circuit board (116, 216).

4. The connection element (110, 210) according to claim 3, wherein only the first ring (111, 211) is configured to be attached with fasteners to the counter bearing (118, 218) to mechanically anchor the circuit board (116, 216), whereas the second ring (112, 212) is only fixed to the first ring (111, 211) to mechanically anchor the circuit board (116, 216).

5. The connection element (110, 210) according to claim 1, wherein an inner contour (123, 223) of the first ring (111, 211) has abutment surfaces which are provided to cooperate with marginal edges of the circuit board (116, 216) to hold the circuit board (116, 216) in the parallel direction with respect to the mounting surface of the counter bearing (118, 218), and wherein the first ring (111, 211) at least partially receives an outer contour of the circuit board (116, 216) for this purpose.

6. The connection element (110, 210) according to claim 1, wherein the second ring (112, 212) is mounted coaxially inside the first ring (111, 211), and wherein the first ring (111, 211) is an outer ring and surrounds the second ring (112, 212) formed as an inner ring.

7. The connection element (110) according to claim 6, wherein the inner ring (112) supports a locking element (156, 280), and wherein the inner ring (112, 212) is fixed inside the outer ring (111, 211) with the locking element (156, 280).

8. The connection element (110, 210) according to claim 7, wherein the outer ring (111, 211) has a tension element (114, 115, 269) in form of a tension spring (115), and wherein the tension spring (115) is configured to hold the inner ring (112, 212) tensioned towards the circuit board (116, 216) inserted in the connection element (110, 210) or towards the counter bearing (118, 218).

9. The connection element (110, 210) according to claim 8, wherein the inner ring (112, 212) has a tension receiving element (154, 137, 280) which interacts with the tension element (114, 115, 269) of the outer ring (111, 211) and transmits tension forces onto the inner ring (112, 212).

10. The connection element (110) according to claim 9, wherein the inner ring (112) can be inserted in an insertion direction into the outer ring (111) and can be fixed in the outer ring (111) by rotating the inner ring (112) in form of a bayonet lock.

11. The connection element (110) according to claim 10, wherein the tension receiving element (154, 137) engages with the tension element (114, 115) as a result of rotating the inner ring (112).

12. The connection element (110, 210) according to claim 9, wherein the tension receiving element (154, 137, 280) and the locking element (155, 137, 262) are formed as a common component.

13. The connection element (210) according to claim 12, wherein the outer ring (211) forms a retaining element in form of a latching projection (269), and wherein the latching projection (269) interacts with the locking element (280) of the inner ring (212) to hold the inner ring (212) in the outer ring (211).

14. The connection element (210) according to claim 13, wherein the retaining element and the tension element (269) are formed as a common component.

15. The connection element (210) according to claim 14, wherein the inner ring (212) is inserted in an insertion direction (E) into the outer ring (211) and is held in the outer ring (211) by a latching connection.

16. The connection element (110, 210) according to claim 1, wherein the first ring (111, 211) is formed as a universal component configured to receive a plurality of different circuit boards (116, 216), whereas the second ring (112, 212) is formed as an individual component for a specific circuit board or a group of specific circuit boards with common circuit board geometry or a common LED size.

17. The connection element (110, 210) according to claim 16, wherein an adapter frame is provided which adapts an inner contour of the first ring (111, 211) to an outer contour of the circuit board (116, 216), to ensure a substantially play-free mounting of the circuit board (116, 216) in the first ring (111, 211).

18. The connection element according to claim 1, wherein only the first ring has receiving holes (126*a*, 226*a*) for a fasteners (118, 218), wherein only the first ring (111/211) is configured to be attached with fasteners to the counter bearing (118, 218) to mechanically anchor the circuit board (116, 216) in the parallel direction with respect to the mounting surface of the counter bearing, wherein the first ring (111, 211) has a retaining part, wherein the second ring (112, 212) has a coupling part, wherein the retaining part and the coupling part interact with each other to fix the second ring (112, 212) to the first ring (111, 211) and to mechanically anchor the circuit board (116, 216) in the vertical direction with respect to the mounting surface of the counter bearing (118, 218), and wherein the second ring (112, 212) can be attached to the first ring (111, 211) independently of an attachment of the first ring (111, 211) to the counter bearing (118, 218).

19. The connection element according to claim 1, wherein the first ring (111, 211) includes a connection chamber (138, 238) that opens towards the counter bearing (118, 218), and wherein the connection contact (113, 213) is held in the connection chamber (138, 238) by frictional engagement, positive engagement, or latching.

20. The connection element according to claim 1, wherein the connection contact (113, 213) comprises a contact bar (141, 241) on an underside of the connection contact (113, 213) facing the counter bearing (118, 218), a contact cover (144, 244) extending substantially parallel to the contact bar (141, 241) above the contact bar (141, 241), a contact side wall (143, 243) extending upwardly from the contact bar (141, 241) to the contact cover (144, 244), a clamping leg (145, 245) which projects downwardly at an angle from the contact cover (144, 244) into a contact input (146, 246) and forms a clamping point for the stripped connection lead, and a contact extension (142, 242) extending away from the clamping leg (145, 245) into a positioning groove (268) of the first ring (111, 211), the contact extension (142, 242) being configured to contact the supply contact.

* * * * *